(12) United States Patent
Oikawa et al.

(10) Patent No.: US 10,748,338 B2
(45) Date of Patent: *Aug. 18, 2020

(54) IMAGE PROCESSING APPARATUS AND IMAGE PROCESSING METHOD

(71) Applicant: CANON KABUSHIKI KAISHA, Tokyo (JP)

(72) Inventors: Makoto Oikawa, Tokyo (JP); Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,221

(22) Filed: Dec. 14, 2016

(65) Prior Publication Data

US 2017/0092011 A1    Mar. 30, 2017

Related U.S. Application Data

(63) Continuation of application No. 14/628,557, filed on Feb. 23, 2015, now Pat. No. 9,558,594, which is a (Continued)

(30) Foreign Application Priority Data

Oct. 10, 2008 (JP) .................. 2008-264629

(51) Int. Cl.
*G06T 19/00* (2011.01)
*G06T 7/73* (2017.01)
(Continued)

(52) U.S. Cl.
CPC .......... *G06T 19/006* (2013.01); *G06F 3/011* (2013.01); *G06K 9/4604* (2013.01); *G06T 7/73* (2017.01);
(Continued)

(58) Field of Classification Search
None
See application file for complete search history.

(56) References Cited

U.S. PATENT DOCUMENTS 7,467,061 B2    12/2008 Satoh et al.
8,103,127 B2    1/2012 Yonezawa et al.
(Continued)

FOREIGN PATENT DOCUMENTS

| JP | 2005-351886 A | 12/2005 |
| JP | 2006-285609 A | 10/2006 |
| JP | 2008-064735 A | 3/2008 |

OTHER PUBLICATIONS

F. Sauer, et al., "Augmented Workspace: designing an AR testbed", Proceedings of the IEEE and ACM International Symposium on Augmented Reality, 2000, pp. 47-53.
(Continued)

*Primary Examiner* — Dakshesh D Parikh
*Assistant Examiner* — Tyler B Edwards
(74) *Attorney, Agent, or Firm* — Venable LLP

(57) ABSTRACT

An index extraction unit detects indices from a sensed image sensed by a sensing unit which senses an image of a physical space on which a plurality of indices is laid out. A convergence arithmetic unit calculates position and orientation information of the sensing unit based on the detected indices. A CG rendering unit generates a virtual space image based on the position and orientation information. A sensed image clipping unit extracts, as a display image, an image in a display target region from the sensed image. An image composition unit generates a composite image by compositing the extracted display image and the generated virtual space image. A display unit displays the composite image.

19 Claims, 23 Drawing Sheets

Related U.S. Application Data continuation of application No. 12/570,129, filed on Sep. 30, 2009, now Pat. No. 9,007,445.

(51) Int. Cl.
  *G06K 9/46* (2006.01)
  *G09G 5/377* (2006.01)
  *H04N 13/279* (2018.01)
  *G06F 3/01* (2006.01)

(52) U.S. Cl.
  CPC .......... *G09G 5/377* (2013.01); *H04N 13/279* (2018.05); *G06T 2207/30204* (2013.01); *G09G 2320/0626* (2013.01); *G09G 2340/12* (2013.01)

(56) References Cited

U.S. PATENT DOCUMENTS

| | | | | |
|---|---|---|---|---|
| 9,007,445 B2 * | 4/2015 | Oikawa | .................. | G06F 3/011 348/53 |
| 2005/0201624 A1 * | 9/2005 | Hara | .................... | H04N 19/647 382/232 |
| 2007/0046776 A1 * | 3/2007 | Yamaguchi | .......... | H04N 13/398 348/53 |
| 2008/0037901 A1 * | 2/2008 | Yonezawa | ............ | G06K 9/3216 382/291 |

OTHER PUBLICATIONS

Aug. 13, 2012 Japanese Office Action corresponding to Japanese Patent Application No. 2008-264629.

* cited by examiner

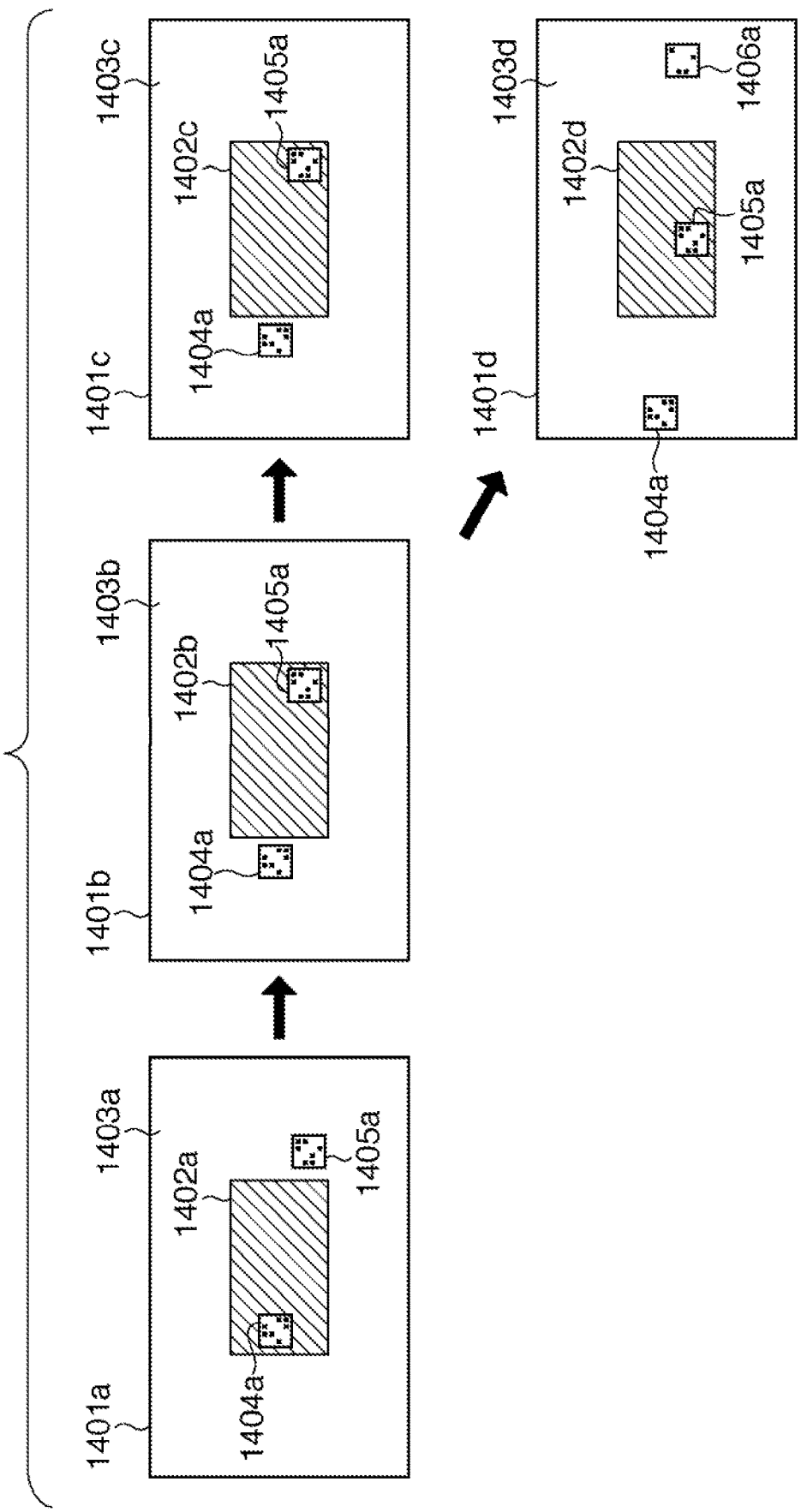

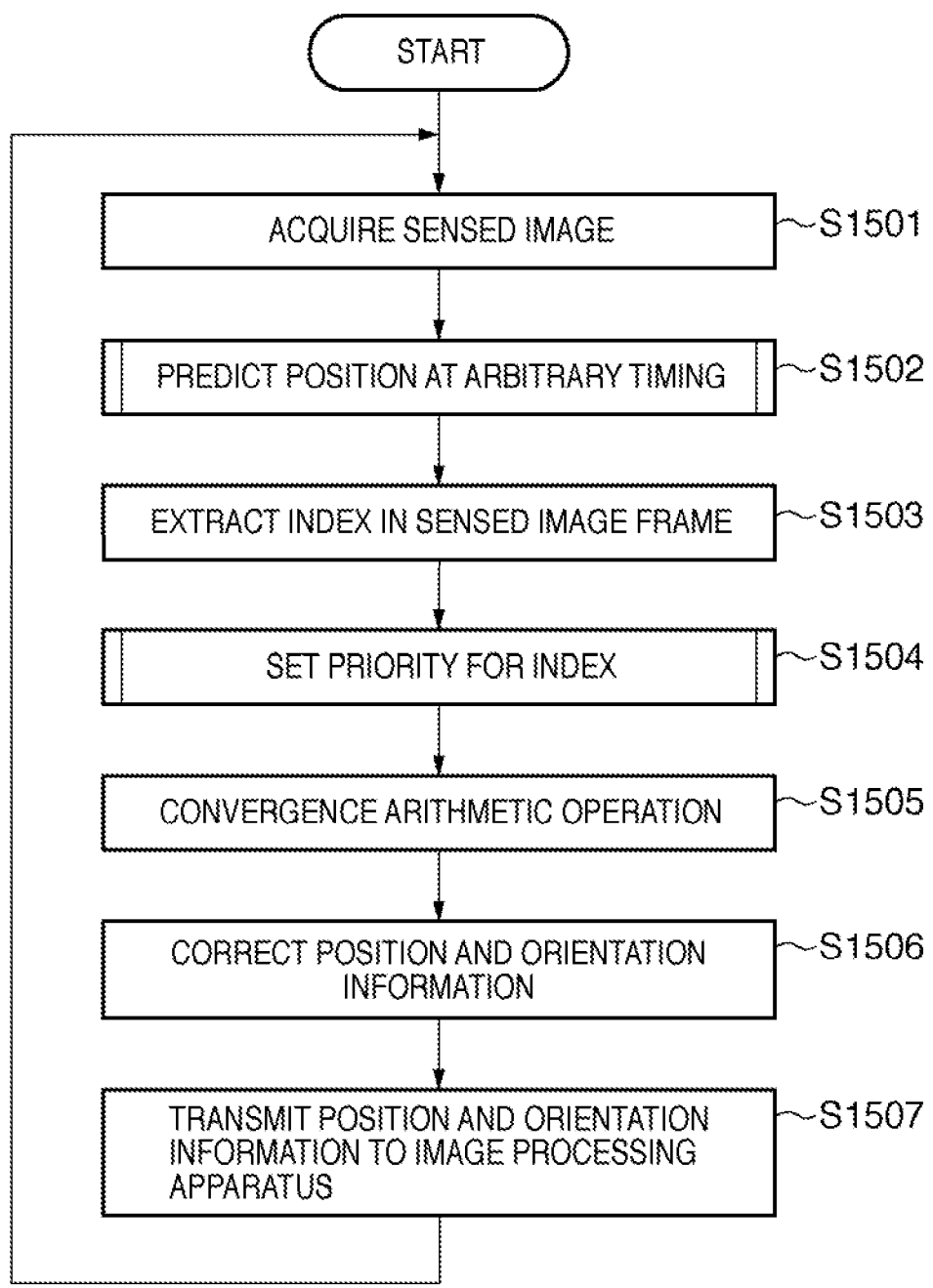

IMAGE PROCESSING APPARATUS AND IMAGE PROCESSING METHOD

This application is a continuation of pending application Ser. No. 14/628,557, filed Feb. 23, 2015, which has been allowed, which is a continuation of pending application Ser. No. 12/570,129, filed Sep. 30, 2009, which has been issued as U.S. Pat. No. 9,007,445.

BACKGROUND OF THE INVENTION

Field of the Invention

The present invention relates to a technique for presenting a composite image of a sensed image and virtual space image to the user.

Description of the Related Art

In recent years, as a technique for seamlessly blending physical and virtual worlds in real time, a so-called MR (Mixed Reality) technique is known. As one MR technique, the following technique is known. That is, an image of an object which nearly matches an object observed from the pupil position of an observer is sensed using a video camera or the like equipped on a video see-through HMD (Head Mounted Display). An image obtained by superimposing a CG (Computer Graphics) on that sensed image is presented to the observer.

The video see-through HMD acquires digital image data of an object by sensing an image of that object using a charge coupled device such as a CCD, and displays an MR image (mixed reality image) obtained by superimposing a CG image on this digital image data. After that, this MR image is presented to the user via a display device such as a liquid crystal element.

A CG image is rendered and is superimposed onto a sensed image based on position and orientation information of an image sensing device such as a video camera equipped on the HMD, that is, the position and orientation information of the head of the HMD user. As typical methods of generating the position and orientation information, the following two methods are available.

In the first method, the position and orientation information is acquired and generated by a three-dimensional position and orientation sensor such as a magnetic sensor or gyro sensor (acceleration, angular velocity). The magnetic sensor is vulnerable to ambient electromagnetic waves, while the gyro sensor is susceptible to a drift phenomenon in which an output voltage drifts. In this way, it is difficult for only the three-dimensional position and orientation sensor to generate stable position and orientation information.

In the second method, information of an index arranged on a physical space is acquired, and position and orientation information is generated based on the acquired information. As the index, a marker having a specific shape or an infrared LED may often be used. The information of that index is acquired using a camera or infrared camera. The position and orientation information is generated based on the size and position of the acquired index and further based on the shape in case of the marker.

A method of locating a camera used to acquire index information is roughly classified into the following two methods.

In the first method, an arrangement required to acquire index information is laid out in an HMD. This method includes a method of attaching an image sensing device to the HMD and acquiring information of the index using this image sensing device. A method in which an infrared camera is arranged near the image sensing device required to sense a physical space image used to generate an MR image, and an infrared marker laid out on a physical space is sensed using that infrared camera to generate position and orientation information is disclosed in Frank Sauer, Fabian Wenzel, Sebastian Vogt, Yiyang Tao, Yakup Genc, Ali Bani-Hashemi, Siemens Corporate Research, Augmented Workspace: designing an AR testbed, Proceedings of the IEEE and ACM International Symposium on Augmented Reality 2000 pp. 47-53.

In the second method, an image sensing device used to acquire index information is arranged at a position where a bird's-eye view around the HMD user can be obtained. With this method, index information can be acquired from a region broader than a case in which the image sensing device is arranged on the HMD depending on the number and layout of image sensing devices.

Japanese Patent Laid-Open No. 2005-351886 discloses a method of generating position and orientation information using infrared marker information attached to an HMD acquired by an infrared camera that can obtain a surrounding bird's-eye view in addition to marker information acquired by an image sensing device of the HMD.

Upon stably acquiring position and orientation information based on information from a broader space, a larger number of indices have to be set on the physical space. Also, in a video see-through HMD that has to use the same field angle since it is technically difficult to set the field angle of an optical system of the HMD to be broader than that of an image sensing system, the field angle of the image sensing system is constrained to that of the display system. When the display system and image sensing system have the same field angle, a CG is displayed in a moment when an index appears in a sensed image, and the continuity of a CG display may often be lost. When index information in a region within a range broader than a displayable range of the display system of the HMD can be obtained, the number of indices to be set can be reduced. However, arranging an image sensing device independently of the image sensing device of the HMD leads to an increase in scale and complexity of the system arrangement.

SUMMARY OF THE INVENTION

The present invention has been made in consideration of the aforementioned problems, and provides a technique which can realize a simpler arrangement of a system which generates an MR image using a fewer number of indices and presents the generated MR image to the user.

According to the first aspect of the present invention, an image processing apparatus comprises:

a sensing unit which senses an image of a physical space on which a plurality of indices is laid out;

a detection unit which detects the indices from a sensed image sensed by the sensing unit;

a calculation unit which calculates position and orientation information of the sensing unit based on the indices detected by the detection unit;

a generation unit which generates a virtual space image based on the position and orientation information calculated by the calculation unit;

an extraction unit which extracts, as a display image, an image within a display target region from the sensed image;

a composition unit which generates a composite image by compositing the display image extracted by the extraction unit and the virtual space image generated by the generation unit; and a display unit which displays the composite image generated by the composition unit.

According to the second aspect of the present invention, an image processing method wherein comprises:

a sensing step of sensing, using a sensing unit, an image of a physical space on which a plurality of indices is laid out;

a detection step of detecting the indices from a sensed image sensed by the sensing unit;

a calculation step of calculating position and orientation information of the sensing unit based on the indices detected in the detection step;

a generation step of generating a virtual space image based on the position and orientation information calculated in the calculation step;

an extraction step of extracting, as a display image, an image within a display target region from the sensed image;

a composition step of generating a composite image by compositing the display image extracted in the extraction step and the virtual space image generated in the generation step; and a display step of displaying the composite image generated in the composition step.

Further features of the present invention will become apparent from the following description of exemplary embodiments with reference to the attached drawings.

BRIEF DESCRIPTION OF THE DRAWINGS

FIG. 14 is a view showing processing for making a priority setting based on a motion amount;

FIG. 15 is a flowchart of processing in an HMD 1201 for settling a display image, generating position and orientation information, and transmitting the position and orientation information to an image processing apparatus 1202;

DESCRIPTION OF THE EMBODIMENTS

Embodiments of the present invention will be described hereinafter with reference to the accompanying drawings. Note that these embodiments will be explained as examples of the arrangement of the invention described in the scope of the claims, and the invention is not limited to the embodiments to be described hereinafter.

First Embodiment

Figure 1:
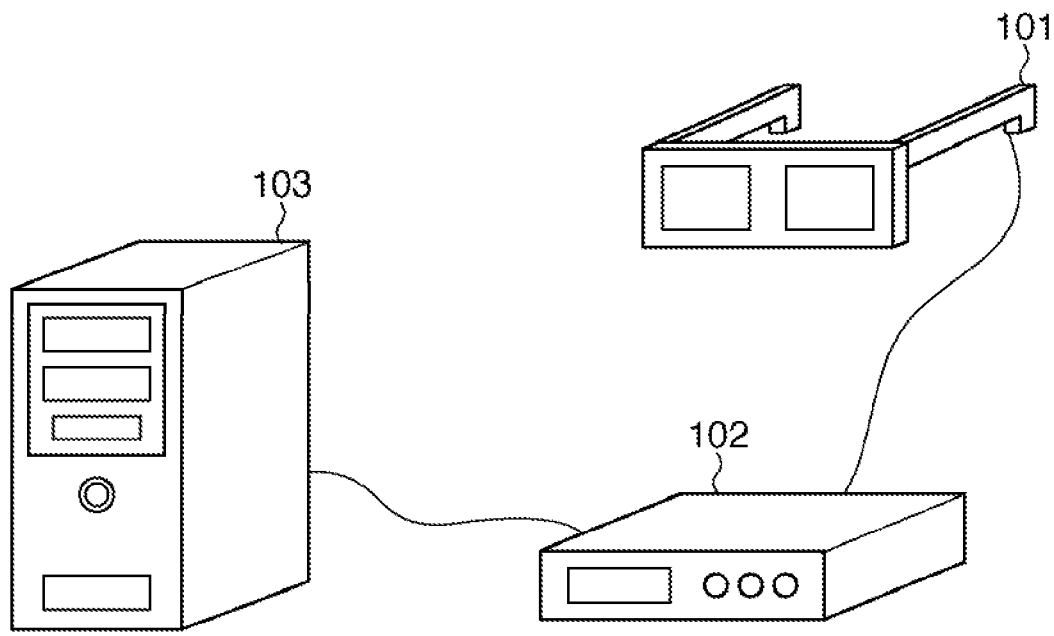
FIG. 1 is a view showing an example of the outer appearance of a system which is applicable to a system according to the first embodiment of the present invention.

FIG. 1 is a view showing an example of the outer appearance of a system which is applicable to a system according to this embodiment. The system shown in FIG. 1 includes an HMD 101, controller 102, and image processing apparatus 103.

A mixed reality technique, that is, a so-called MR technique as a technique for seamlessly blending physical and virtual spaces in real time, uses a display apparatus with an image sensing function. In the following description, the display apparatus with an image sensing function will be referred to as an HMD. Note that this display apparatus may be a hand-held type apparatus such as binoculars and is not limited to a head-mounted apparatus. With the MR technique, a CG image, which is generated based on three-dimensional position and orientation information including the position and direction of a user's viewpoint, is superimposed on a background image of a physical space, which is acquired by an image sensing device of the HMD and is observed from the user's viewpoint, and that image is displayed on a display unit of the HMD. Then, the HMD user can experience mixed reality as if an object rendered by CG were existing on the physical space observed by the user.

The HMD 101 includes a sensing unit used to sense an image of the physical space, and a display unit used to display an image received from the image processing apparatus 103 via the controller 102. The HMD 101 can communicate with the controller 102, and the image of the physical space sensed by the sensing unit is output to this controller 102. Note that the HMD 101 may be driven either by receiving a power supply from the controller 102 or by a battery.

The controller 102 applies various kinds of processing to an image received from the HMD 101, and transmits this image to the image processing apparatus 103.

The image processing apparatus 103 can communicate with the controller 102, and has a generation unit which generates an image of a virtual space based on the image of the physical space received from the controller 102, and a composition unit which generates a composite image by compositing the generated image of the virtual space to the image of the physical space. The composition unit transmits the generated composite image to the controller 102.

The controller 102 applies various kinds of processing to the composite image received from the image processing apparatus 103, and outputs this composite image to the HMD 101. Note that the controller 102 has a function of applying various kinds of image processing such as resolution conversion, color space conversion, and distortion correction of an optical system, and transmission format conversion to the images received from the HMD 101 and image processing apparatus 103.

The display unit of the HMD 101 displays the composite image output from the controller 102.

Note that FIG. 1 illustrates the image processing apparatus 103 and controller 102 as independent apparatuses. However, the image processing apparatus 103 and controller 102 may be integrated into one apparatus. Alternatively, the HMD 101 may include some or all of the functions of the controller 102. The respective apparatuses may communicate with each other wirelessly or via cables.

In the following description, an apparatus that integrates the controller 102 and HMD 101 will be described as one HMD for the sake of simplicity.

Figure 2:
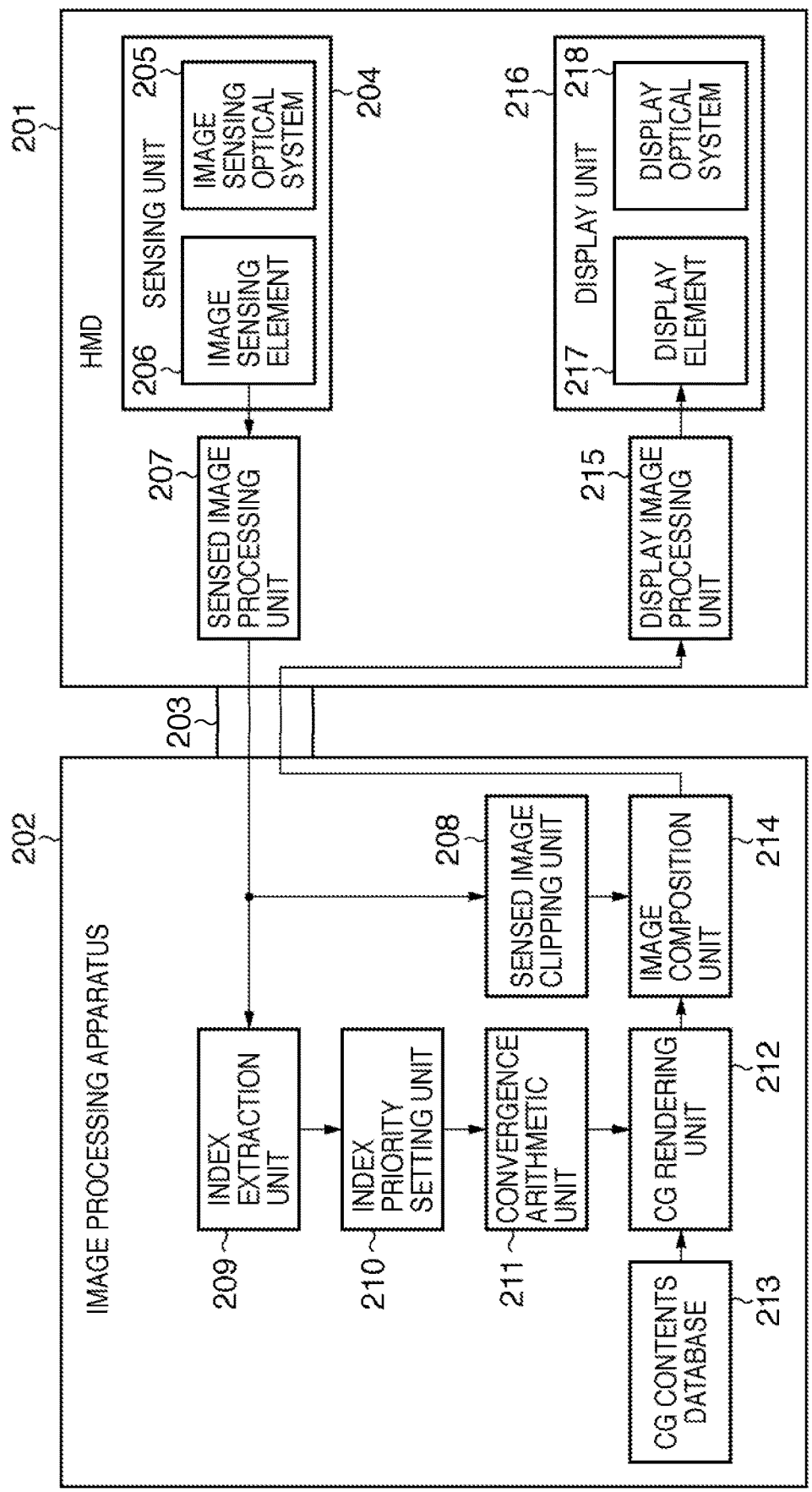
FIG. 2 is a block diagram showing an example of the functional arrangement of the system according to the first embodiment of the present invention.

FIG. 2 is a block diagram showing an example of the functional arrangement of the system according to this embodiment. As shown in FIG. 2, the system according to this embodiment includes an HMD 201 and image processing apparatus 202.

The HMD 201 will be described first. The HMD 201 is a display apparatus as an example of a so-called video see-through head mounted display apparatus. The HMD 201 includes a sensing unit 204 which senses an image of the physical space, and a display unit 216 which displays an image output from the image processing apparatus 202. Furthermore, the HMD 201 includes a sensed image processing unit 207 which applies various kinds of processing to an image received from the sensing unit 204, and a display image processing unit 215 which applies various kinds of processing to an image received from the image processing apparatus 202.

The sensing unit 204 is used to sense an image of the physical space observed from a position and orientation which nearly match those of the eyes of a user who wears the HMD 201 on the head, and includes an image sensing optical system 205 and image sensing element 206. The image sensing optical system 205 is used to form an image of an external light beam on the image sensing element 206. The image sensing element 206 is an area sensor such as a CCD or CMOS, and forms an image as a result of image formation by the image sensing optical system 205. This image is a sensed image (physical space image), which is output to the sensed image processing unit 207.

The sensed image processing unit 207 updates the sensed image output from the sensing unit 204 by reducing the data amount of a region (outside a display target region, that is, a non-display region) which is not displayed on the display unit 216. Of course, assume that information required to specify a displayable region of the display unit 216 in the sensed image is given, and this information is held by one or both of the HMD 201 and image processing apparatus 202. The sensed image processing unit 207 transmits this updated sensed image to the image processing apparatus 202 via a communication channel 203.

This communication channel 203 may be either a wireless or wired channel.

The display image processing unit 215 receives a composite image (MR image) transmitted from the image processing apparatus 202 via this communication channel 203. The display image processing unit 215 converts the resolution and frame frequency of this composite image in correspondence with a display element 217, and applies distortion correction that cancels distortions of a display optical system 218 to this composite image. After that, the display image processing unit 215 executes processing for applying a low-pass filter so as to remove, for example, moiré. The display image processing unit 215 outputs the composite image that has undergone various kinds of image processing to the display unit 216.

The display unit 216 is used to display the composite image received from the display image processing unit 215, and is attached to the HMD 201 to be located in front of the eyes of the user who wears the HMD 201 on the head. The display unit 216 includes the display element 217 and display optical system 218.

The display element 217 includes, for example, a compact liquid crystal display or retinal scanning device based on a MEMS. The display element 217 displays the composite image received from the display image processing unit 215, thereby irradiating light corresponding to respective pixels that form this composite image.

The display optical system 218 enlarges light irradiated from the display element 217, and guides the enlarged light toward the eyeballs of the user as a light beam of a certain width. As a result, the composite image displayed by the display element 217 is projected in an enlarged scale to a position in front of the eyes of the user.

The image processing apparatus 202 will be described below. The image processing apparatus 202 includes an index extraction unit 209, index priority setting unit 210, convergence arithmetic unit 211, CG rendering unit 212, CG contents database 213, image composition unit 214, and sensed image clipping unit 208.

Upon reception of a sensed image output from the HMD 201, the index extraction unit 209 executes processing for detecting respective indices included in this sensed image. In this embodiment, since a plurality of indices are laid out on the physical space, the sensed image naturally includes one or more indices. Therefore, the index extraction unit 209 executes processing for detecting indices included in the sensed image. Note that since a technique for detecting indices from a sensed image is a state-of-the-art technique, a description thereof will not be given.

The index priority setting unit 210 sets priorities for respective indices detected by the index extraction unit 209. The subsequent convergence arithmetic unit 211 preferentially uses indices with higher priorities.

The convergence arithmetic unit 211 calculates (computes) position and orientation information of the sensing unit 204 using the respective indices detected by the index extraction unit 209 and the priorities set for the respective indices by the index priority setting unit 210.

In the CG contents database 213, data of respective virtual objects which form a virtual space, environmental information of the virtual space, and the like are registered in advance. For example, shape information and position and orientation information of each virtual object, operation rule information, position and orientation information of each light source laid out on the virtual space, type information of the light source, and the like are registered in advance in the CG contents database 213.

The CG rendering unit 212 builds up the virtual space using the data registered in the CG contents database 213. Then, the CG rendering unit 212 generates, as a virtual space image, an image which is obtained when the built-up virtual space is viewed from a viewpoint having a position and orientation indicated by the position and orientation information calculated by the convergence arithmetic unit 211. Note that since a technique for generating an image of the virtual space which is viewed from a viewpoint having a predetermined position and orientation is known to those who are skilled in the art, a description thereof will not be given.

The sensed image clipping unit 208 clips, as a display image, an image within a displayable range (display target region) of the display unit 216 of the sensed image output from the HMD 201. The sensed image clipping unit 208 then outputs the clipped display image to the image composition unit 214.

The image composition unit 214 generates a composite image as the MR image by compositing the virtual space image generated by the CG rendering unit 212, and the display image received from the sensed image clipping unit 208. Note that various conventional methods have been proposed as a composition method of a virtual space image and display image to obtain an MR image, and a composite image may be obtained using any of those methods in this embodiment.

The image composition unit 214 then outputs the generated composite image to the HMD 201 via the communication channel 203.

Figure 5:
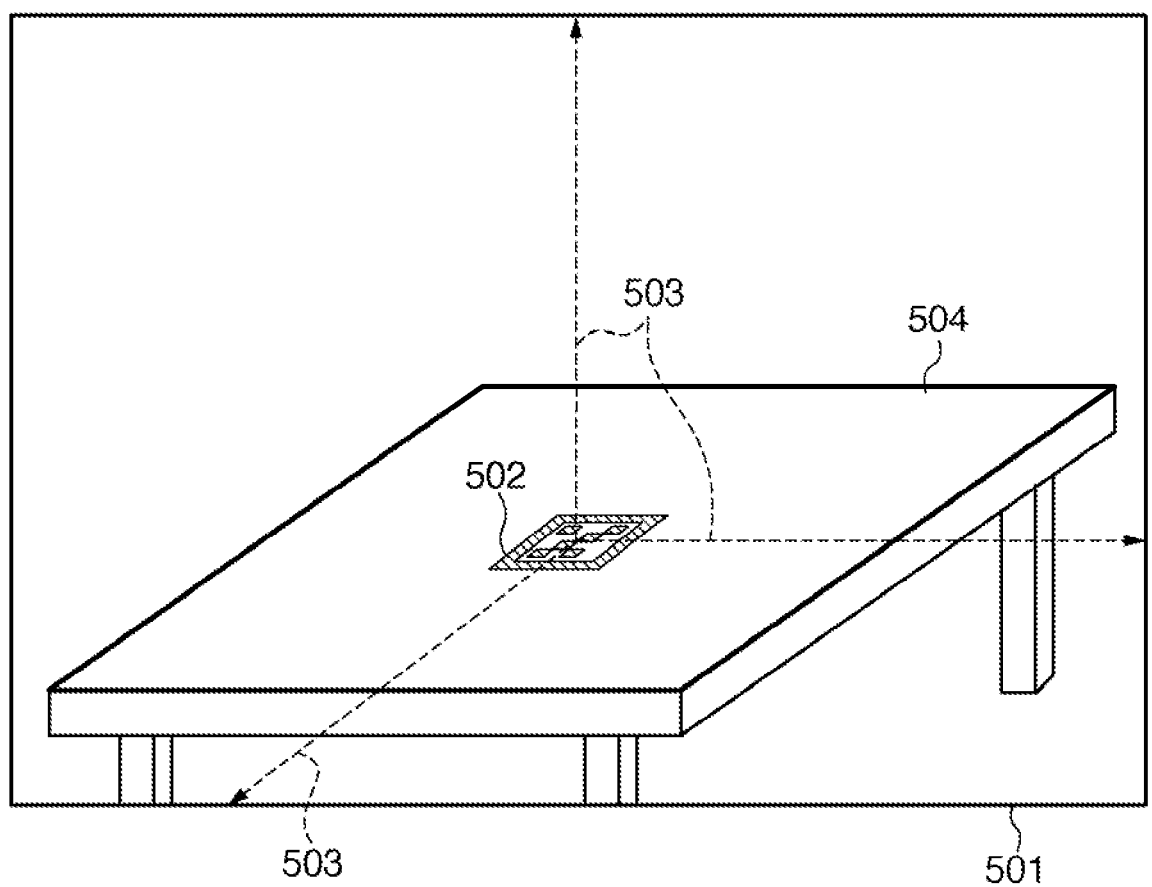
FIG. 5 is a view showing a marker as an index set on a physical space.

The indices laid out on the physical space will be described below. FIG. 5 is a view showing a marker as an index laid out on the physical space. Referring to FIG. 5, reference numeral 501 denotes a sensed image; 502, a marker; 503, a coordinate system with reference to the marker (marker coordinate system); and 504, the contour of a table on which the marker 502 is laid out.

Upon reception of such sensed image 501 from the HMD 201, the index extraction unit 209 detects the marker 502 from the sensed image 501. Then, the index extraction unit 209 generates information associated with the layout position of the marker 502 and that of the viewpoint where the user observes the marker 502, based on information such as the size, shape, and paint pattern of the marker 502. In this case, for example, the coordinate system 503 having the central portion of the marker 502 as an origin is assumed. However, the origin of the coordinate system need not be set on the marker 502, and a coordinate system can be set at an arbitrary position as long as the positional relationship between the origin of the coordinate system and the marker 502 is given. Also, in this case, only one marker is used, but a plurality of markers can be used at the same time. When a plurality of markers are used at the same time, the positional relationship among the markers is defined in advance, thus allowing to calculate the viewing direction of the marker based on the positional relationship. Therefore, in place of the marker that allows to also identify the direction based on the internal paint pattern shown in FIG. 5, for example, markers having no directionality such as color markers or light-emitting elements such as LEDs may be used.

In place of the marker, feature points in the sensed image such as the contour 504 of the table, and a specific color in the sensed image may be extracted to generate position and orientation information using such information. When a plurality of markers of the same type are used, several types of markers are used at the same time, or marker information and information of feature points in the sensed image are combined, position and orientation information on a space of a broad range can be generated with high precision. Furthermore, since the positional relationship among the plurality of markers and feature points is associated in advance, even when not all markers or feature points are displayed in the sensed image, the positions of the respective markers and feature points can also be estimated.

Of course, the configuration used to calculate the position and orientation information of the viewpoint using the markers is not limited to this.

Figure 6:
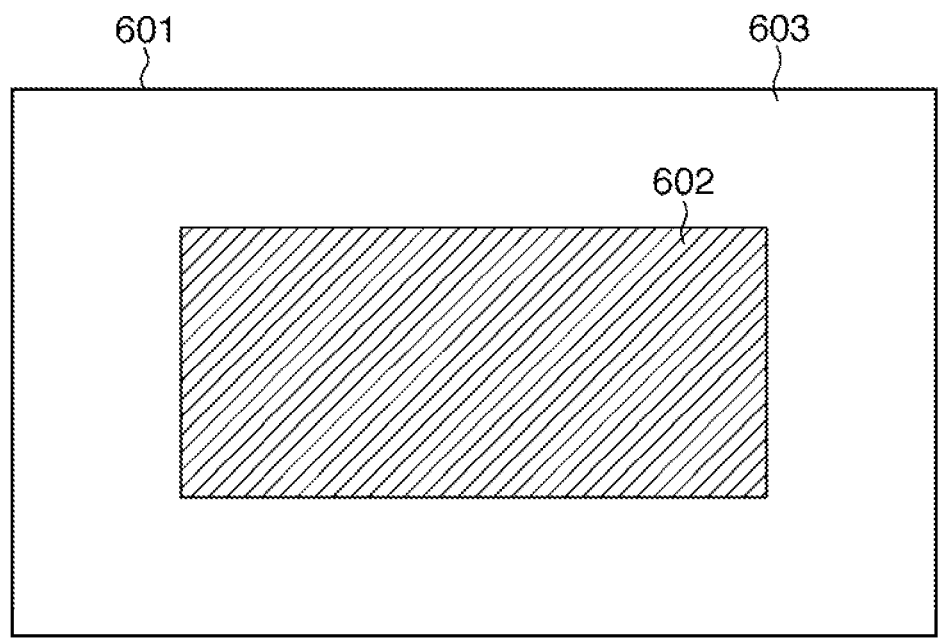
FIG. 6 is a view showing correspondence between a sensed image and display image.

The relationship between the sensed image and display image will be described below. FIG. 6 is a view showing correspondence between the sensed image and display image. Referring to FIG. 6, reference numeral 601 denotes an image region which can be sensed by the sensing unit 204, and corresponds to the entire region of the sensed image. Reference numeral 602 denotes a displayable region of the display unit 216 in the image region 601; and 603, a non-displayable region of the display unit 216 in the image region 601.

The image region 601 is set to be larger than the displayable region 602 of the display unit 216. In this embodiment, assume that the axes of the image sensing optical system 205 and display optical system 218 are designed, so that the central position of the region 602 overlaps that of the image region 601, as shown in FIG. 6. This is to display a less distorted central portion since the sensed image is distorted more toward a fringe portion due to the influence of a lens distortion of the image sensing optical system 205. Since an image within the region 603 need only be used to extract indices, the sensed image processing unit 207 may reduce the data amount of the image in this region 603 upon transmitting the sensed image from the HMD 201 to the image processing apparatus 202 via the communication channel 203. Various kinds of processing for reducing the data amount are available. For example, luminance information alone of each pixel in the region 603 may be left, or the resolution may be reduced by decimating pixels in the region 603. Then, the amount of data to be exchanged between the HMD 201 and image processing apparatus 202 can be reduced, thus assuring an enough bandwidth.

Figure 7A:
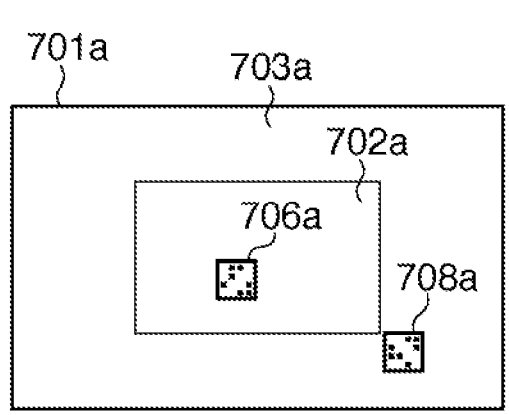
FIGS. 7A and 7B are views showing two different priority setting methods.
Figure 7B:
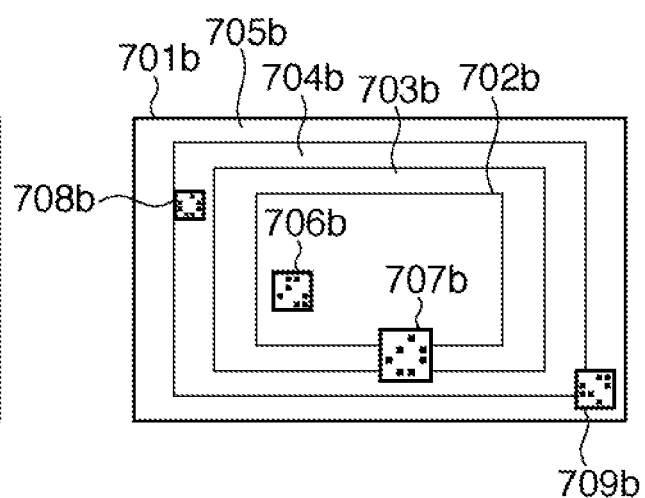

The priority setting processing executed by the index priority setting unit 210 will be described below. FIGS. 7A and 7B are views showing two different priority setting methods.

The priority setting method shown in FIG. 7A will be described first. Referring to FIG. 7A, reference numeral 701*a* denotes a sensed image, which is divided into regions 702*a* and 703*a*. In this embodiment, since higher priorities are set for indices closer to the central position of an image, the priority for an index located within the region 702*a* is set to be higher than that for an index located within the region 703*a* in case of FIG. 7A. More specifically, an index 706*a* is located within the region 702*a*, and an index 708*a* is located within the region 703*a*. Hence, the priority for the index 706*a* is set to be higher than that for the index 708*a*.

The priority setting method shown in FIG. 7B will be described below. Referring to FIG. 7B, reference numeral 701*b* denotes a sensed image, which is divided into regions 702*b*, 703*b*, 704*b*, and 705*b*. In this embodiment, higher priorities are set for indices closer to the central position of an image. Therefore, in case of FIG. 7B, the priority for an index located within the region 702*b* is highest, and that for an index located within the region 703*b* is second highest. Then, the priority for an index located within the region 704*b* is third highest, and that for an index located within the region 705*b* is lowest. In case of FIG. 7B, the priority for an index 706*b* is highest, that for an index 707*b* is second highest, that for an index 708*b* is third highest, and that for an index 709*b* is lowest.

In this manner, the priorities for the respective indices in the sensed image are decided. Note that the priority setting method is not limited to the methods shown in FIGS. 7A and 7B as long as higher priorities can be set for indices closer to the central position of an image.

Note that the sensed images 701*a* and 701*b* are distorted more toward their fringe portions due to the influence of a lens distortion of the image sensing optical system 205. For this reason, position and orientation information with higher precision can be generated using indices closer to the center of an image. In order to preferentially use indices closer to the center of an image, the index priority setting unit 210 divides the sensed image into a plurality of regions, as shown in FIGS. 7A and 7B, and sets priorities by determining the regions including the indices.

After the priorities are set for the respective indices in this way, the convergence arithmetic unit 211 makes convergence arithmetic operations using an index with a highest priority and generates position and orientation information. Alternatively, the convergence arithmetic unit 211 may weight the respective indices according to their priorities, and may generate position and orientation information using these plurality of indices. When an index extends over a plurality of regions, the following processing may be executed.

For example, assume that index X is located to extend over regions P, Q, and R, which are closer to the image central position in this order. In order to enhance the precision of position and orientation information, it may be determined that index X belongs to region R. Of course, conversely, it may be determined that index X belongs to region P. Alternatively, a region to which the central position of index X belongs of regions P, Q, and R may be determined as the region to which this index X belongs.

As described above, the sensed image is distorted more toward the fringe portion. This distortion can be corrected by signal processing. However, as an image suffers a larger distortion, an error at the time of correction becomes larger.

In consideration of the image quality of the display image, the region 602 is desirably located at the center of the sensed image. The same applies to generation of position and orientation information, and position and orientation information with higher precision can be generated based on a central index included in the sensed image. Hence, it is desirable to match the region 602 with a high-priority region at the same position close to the center. Upon reducing the data amount of the region 603, the image quality of the region 603 is impaired, and the precision of position and orientation information lowers to some extent. Even in this case, it is significant to prioritize the region 602 and to lower the priority of the region 603. For this reason, it is desirable to set the region 602 as a highest-priority region (702*a* or 702*b*) or to set the priority of the region 602 to be higher than the region 603 and to set a higher priority for a position closer to the image central position in the region 602. When an index extends over the regions 602 and 603, a priority of either of the regions 602 and 603 is set for that index, as described above.

In this manner, since a higher priority is given to an index closer to the image center of the sensed image and is preferentially used, position and orientation information with high precision can be calculated.

Figure 8:
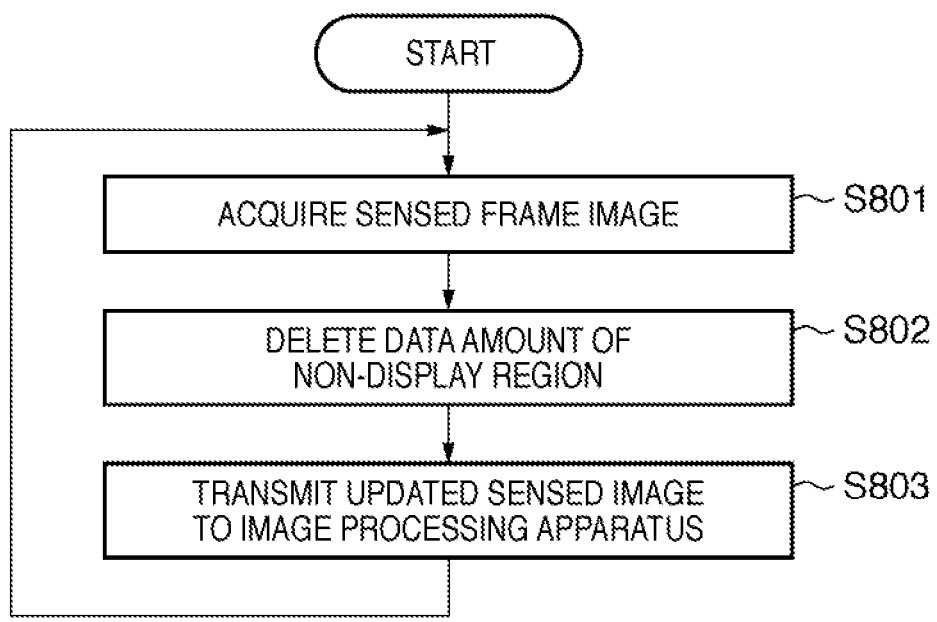
FIG. 8 is a flowchart showing processing by a sensing unit 204 and sensed image processing unit 207.

FIG. 8 is a flowchart of processing by the sensing unit 204 and sensed image processing unit 207. Note that since the processing according to the flowchart shown in FIG. 8 is that for a sensed image for one frame, it is repeated for sensed images of respective frames in practice.

In step S801, the sensing unit 204 senses an image of the physical space for one frame, and outputs the sensed image to the subsequent sensed image processing unit 207.

In step S802, the sensed image processing unit 207 updates the sensed image received from the sensing unit 204 by deleting the data amount in a region corresponding to a portion which is not displayed by the display unit 216 (non-display portion) of the sensed image.

In step S803, the sensed image processing unit 207 outputs the sensed image updated in step S802 to the image processing apparatus 202 via the communication channel 203.

The process then returns to step S801 to execute the subsequent processes for the next frame.

Figure 9:
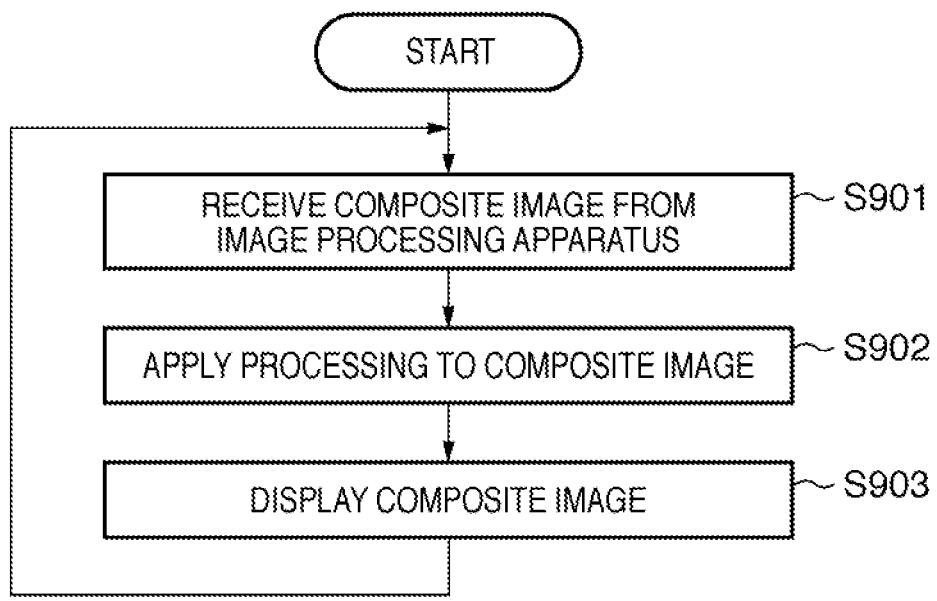
FIG. 9 is a flowchart showing processing by a display image processing unit 215 and display unit 216.

FIG. 9 is a flowchart of processing by the display image processing unit 215 and display unit 216. Note that since the processing according to the flowchart shown in FIG. 9 is that for a composite image for one frame, it is repeated for composite images of respective frames in practice.

In step S901, the display image processing unit 215 acquires a composite image transmitted from the image processing apparatus 202 via the communication channel 203.

In step S902, the display image processing unit 215 applies various kinds of processing to the composite image received in step S901. For example, the display image processing unit 215 executes processing for converting the resolution and frame frequency of the composite image in correspondence with the display element 217, and processing for canceling any distortion of the display optical system 218 in association with the composite image. The display image processing unit 215 then executes processing for applying a low-pass filter to remove, for example, moiré.

In step S903, the display image processing unit 215 outputs the composite image that has undergone the image processing in step S902 to the display unit 216. Then, the display unit 216 displays the composite image that has undergone the image processing by the display image processing unit 215.

The process then returns to step S901 to execute the subsequent processes for the next frame.

Figure 10:
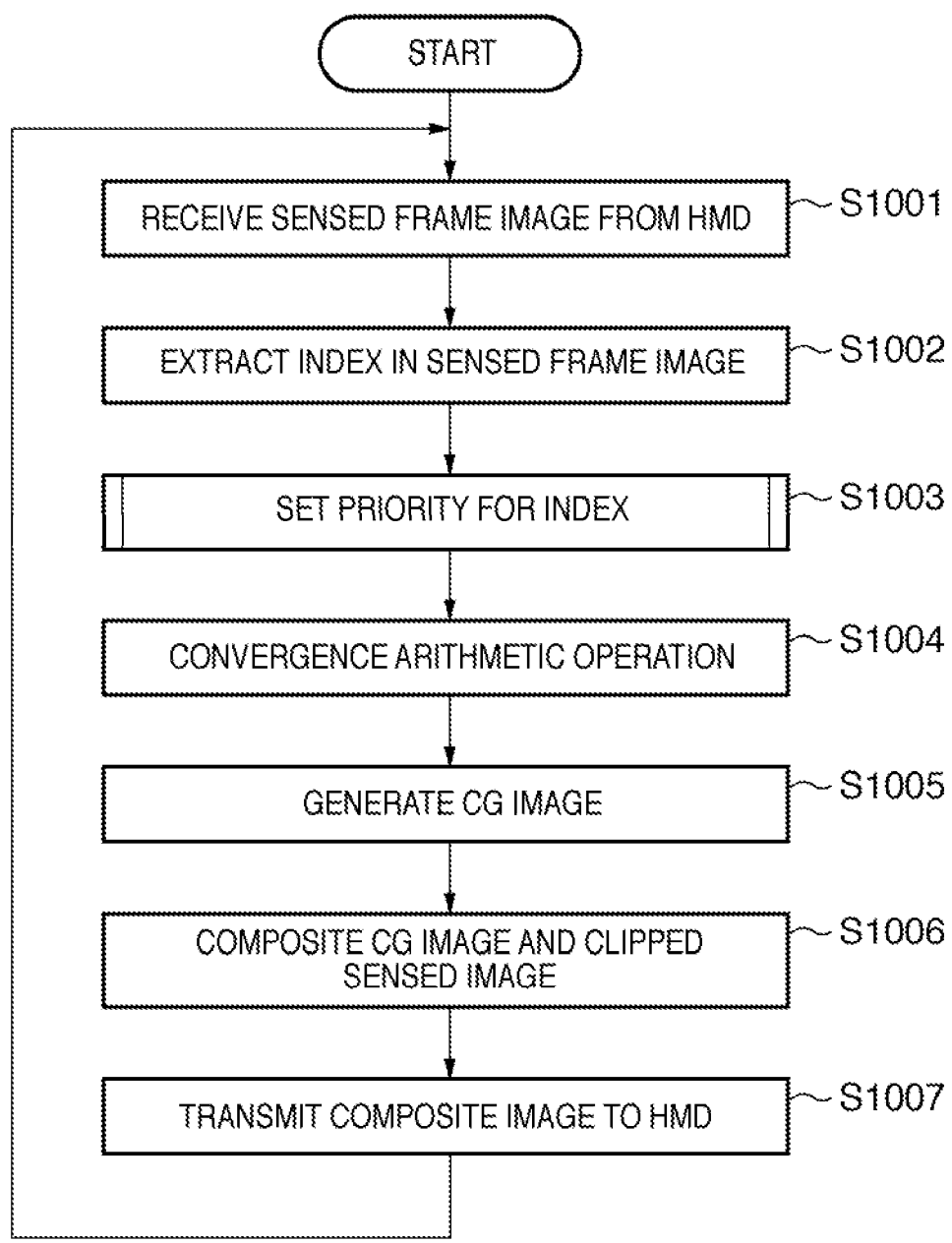
FIG. 10 is a flowchart showing processing executed by an image processing apparatus 202.

FIG. 10 is a flowchart of processing executed by the image processing apparatus 202. Note that since the processing according to the flowchart shown in FIG. 10 is that for an image for one frame, it is repeated for images of respective frames in practice.

In step S1001, the index extraction unit 209 and sensed image clipping unit 208 acquire a sensed image transmitted from the HMD 201 via the communication channel 203.

In step S1002, the index extraction unit 209 detects indices from the sensed image acquired in step S1001.

In step S1003, the index priority setting unit 210 sets priorities for the respective indices based on the detection positions of the indices extracted by the index extraction unit 209 in step S1002. Details of the processing in step S1003 will be described later using FIG. 11.

In step S1004, the convergence arithmetic unit 211 calculates the position and orientation information of the sensing unit 204 using the indices extracted by the index extraction unit 209 in step S1002 and the priorities set for the respective indices in step S1003.

In step S1005, the CG rendering unit 212 builds up a virtual space using the data registered in the CG contents database 213. Next, the CG rendering unit 212 generates an image of the virtual space which can be viewed from a viewpoint having a position and orientation indicated by the position and orientation information calculated in step S1004.

In step S1006, the image composition unit 214 generates a composite image by compositing a display image clipped by the sensed image clipping unit 208, and the image of the virtual space generated by the CG rendering unit 212 in step S1005.

In step S1007, the image composition unit 214 outputs the composite image generated in step S1006 to the HMD 201 via the communication channel 203.

Figure 11:
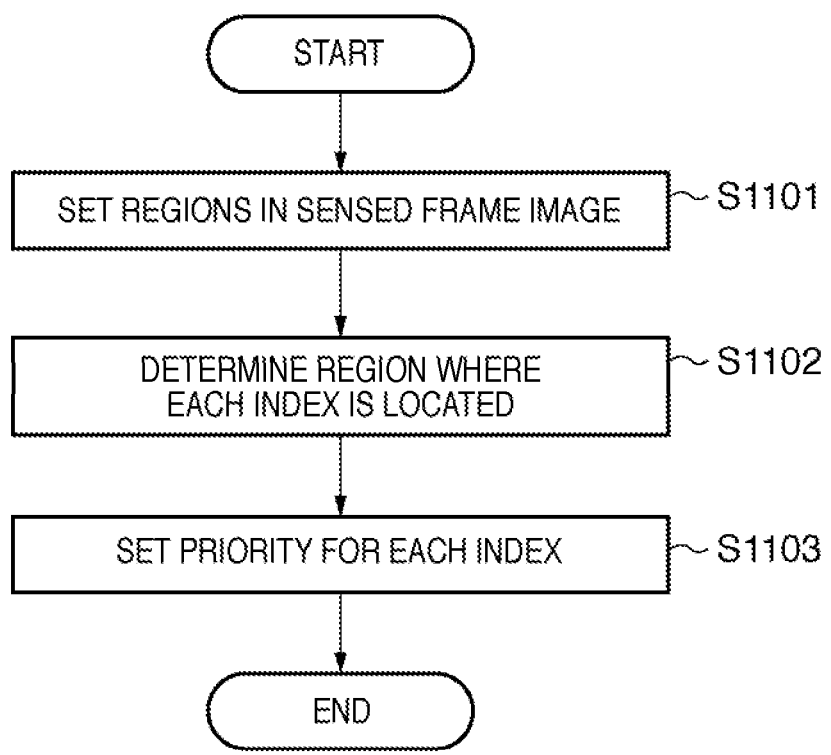
FIG. 11 is a flowchart showing details of processing in step S1003.

FIG. 11 is a flowchart showing details of the processing in step S1003.

In step S1101, the index priority setting unit 210 divides the sensed image into a plurality of regions. The division method is not particularly limited, and the index priority setting unit 210 may divide the sensed image into two regions, as shown in FIG. 7A, or four regions, as shown in FIG. 7B. Then, the index priority setting unit 210 sets priorities for the respective divided regions. In this case, higher priorities are set for regions closer to the central position of an image. Note that the index priority setting unit 210 may execute the processing in step S1101 in advance, and may manage information required to specify the respective divided regions, and priority information for the respective divided regions.

In step S1102, the index priority setting unit 210 refers to the positions of the indices detected in step S1002 to determine the regions to which the respective indices belong.

In step S1103, the index priority setting unit 210 sets, for the respective indices, the priorities which are set for the divided regions to which these indices belong. For example, if it is determined in step S1102 that index X belongs to divided region P, the index priority setting unit 210 sets, for this index X, the priority set for divided region P in step S1101, in step S1103.

As described above, according to this embodiment, since a part of a sensed image is used as a display image (the field angle of a sensed image is set to be broader than that of a display image), position and orientation information can be calculated using indices which are not included in the display image.

Since an index closer to the center that suffers less distortion in the sensed image is preferentially used, position and orientation information with higher precision can be calculated.

In this embodiment, the image processing apparatus 202 includes the sensed image clipping unit 208, index extraction unit 209, index priority setting unit 210, and convergence arithmetic unit 211. However, the present invention is not limited to such specific arrangement, and the HMD 201 may include these units.

Second Embodiment

A characteristic feature of this embodiment lies in that a time delay from image sensing until display is eliminated to enhance realtimeness. In the first embodiment, the image composition unit is included in the image processing apparatus side. However, in this embodiment, this image composition unit is included in the HMD side. As a result, a processing time required to acquire a sensed image on the image processing apparatus side is shortened.

In this embodiment, the number of indices used to generate position and orientation information is limited, and a delay caused by the processing load of convergence arithmetic operations is eliminated.

Furthermore, this embodiment also has the following characteristic feature. That is, the next image sensing position is predicted based on the motion of a sensed image on the HMD side, and an image in the predicted direction is clipped and presented, thereby hiding (virtually eliminating) a delay time required from image sensing until display. Also, since the priorities of indices are set according to the motion of the head, a deviation of the rendering position of a virtual space image due to frequent switching of indices used in generation of position and orientation information is reduced.

Figure 12:
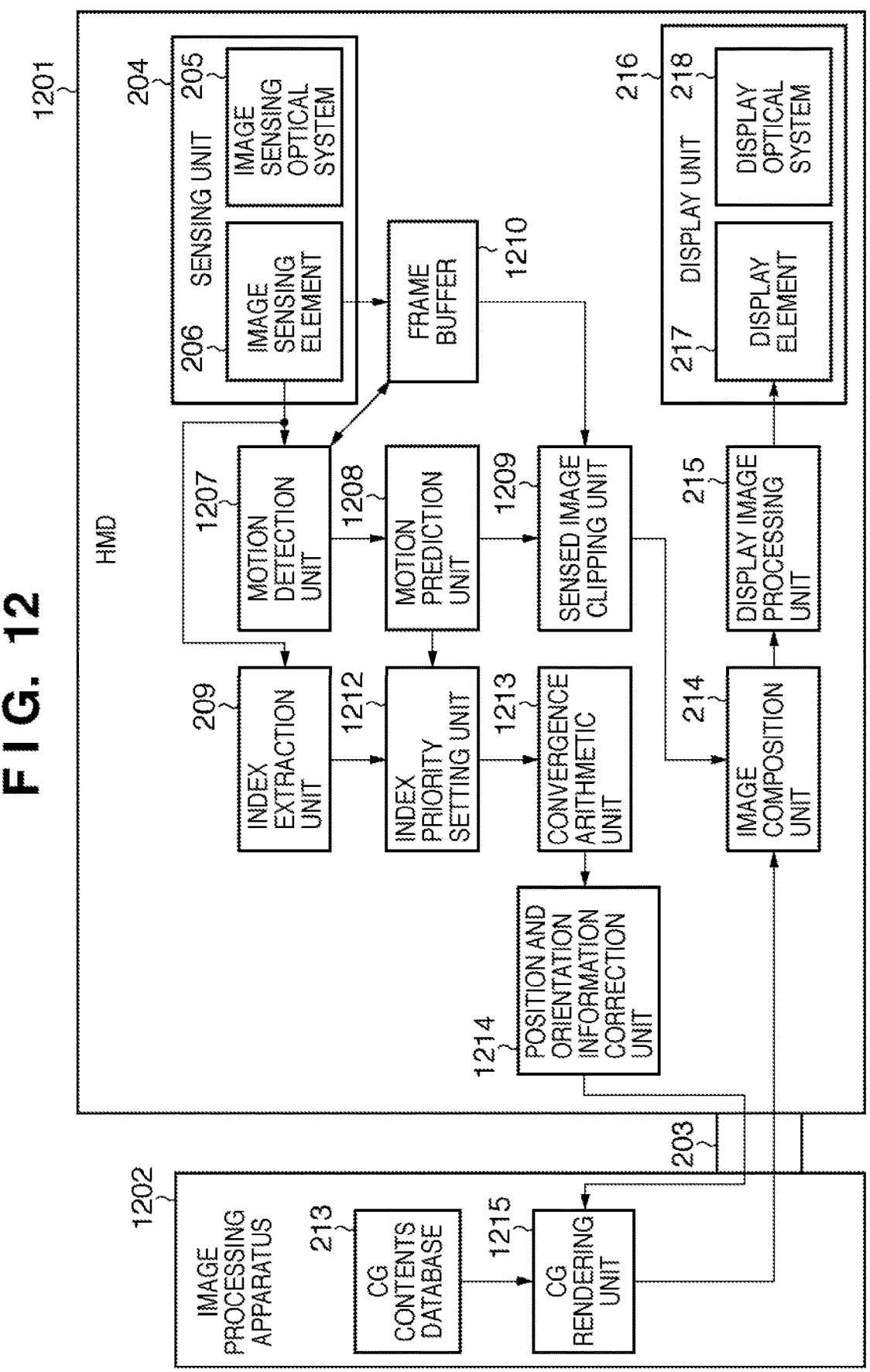
FIG. 12 is a block diagram showing an example of the functional arrangement of a system according to the second embodiment of the present invention.

FIG. 12 is a block diagram showing an example of the functional arrangement of a system according to this embodiment. Note that the same reference numerals denote the same units shown in FIG. 12 as those shown in FIG. 2, and a description thereof will not be repeated. That is, in the following description, only different points of this embodiment from the first embodiment will be explained, and the techniques described in the first embodiment are used for points which will not be described.

As shown in FIG. 12, the system according to this embodiment includes an HMD 1201 and image processing apparatus 1202.

The HMD 1201 will be described first. The HMD 1201 is a display apparatus as an example of a so-called video see-through head mounted display apparatus. The HMD 1201 according to this embodiment calculates a motion amount (for example, a motion vector) in a sensed image of the current frame, and specifies a region of a display image to be clipped from this sensed image based on the calculated motion amount. Then, the HMD 1201 clips an image in the specified region as a display image. Also, the HMD 1201 according to this embodiment controls priority settings for respective indices and generation processing of position and orientation information based on the calculated motion amount. After that, the HMD 1201 executes composition processing of the display image and a virtual space image as in the first embodiment, and displays a composite image as a result of the composition processing.

Units different from the first embodiment of those which configure the HMD 1201 will be described below.

A sensed image of a sensing unit 204 is output to a frame buffer 1210, motion detection unit 1207, and index extraction unit 209.

The frame buffer 1210 stores sensed images of respective frames output from the sensing unit 204.

Upon reception of a sensed image (current frame) from the sensing unit 204, the motion detection unit 1207 calculates a motion amount in the sensed image of the current frame using this sensed image of the current frame, and that of a previous frame stored in the frame buffer 1210. This motion amount corresponds to that of the sensing unit 204. Note that since a technique for calculating a motion amount in the current frame using images of a plurality of frames is a state-of-the-art technique, a description thereof will not be given.

A motion prediction unit 1208 specifies a region which is obtained by moving, based on the motion amount, a region of a display image clipped from the sensed image of the current frame, as described in the first embodiment. Since processing for specifying a future moving position of an arbitrary region in a sensed image of the current frame in this way is a state-of-the-art technique, a description thereof will not be given.

A sensed image clipping unit 1209 clips an image in the region specified by the motion prediction unit 1208 from the sensed image of the current frame as a display image.

An index priority setting unit 1212 sets priorities for respective indices extracted by the index extraction unit 209. The priority setting processing of this embodiment is basically the same as that in the first embodiment, except that the motion amount of the motion prediction unit 1208 is further referred to. The priority setting processing according to this embodiment will be described later using FIG. 14.

A convergence arithmetic unit 1213 calculates position and orientation information of the sensing unit 204 by executing the same processing as in the first embodiment. In this embodiment, the convergence arithmetic unit 1213 uses only specific indices in turn from those in descending order of priority, so as to eliminate a delay time caused by the processing load of convergence arithmetic operations.

A position and orientation information correction unit 1214 predicts and calculates position and orientation information at the time of image composition based on the position and orientation information calculated by the convergence arithmetic unit 1213. As a result, position and orientation gaps between the virtual space image and sensed image, which are caused due to a time required to generate the virtual space image can be hidden. In place of predicting the position and orientation information at the time of image composition, that at the time of display may be predicted. In this case, the sensed image suffers a slight time lag from acquisition until display, but the virtual space image apparently guarantees realtimeness unless the prediction result has a large difference.

In order to predict position and orientation information in an arbitrary future frame based on that of the current frame, for example, the following processing may be executed. That is, when a known linear/nonlinear prediction technique is executed using the position and orientation information of the current frame, and those of a plurality of previous frames, position and orientation information in an arbitrary frame can be calculated.

In this embodiment, this position and orientation information correction unit 1214 is included in the HMD 1201 side, but it may be included in the image processing apparatus 1202 side. When a delay of the virtual space image is permissible, the position and orientation information correction unit 1214 may be omitted.

A CG rendering unit 1215 executes the same processing as in the first embodiment, except that it uses the position and orientation information corrected by the position and orientation information correction unit 1214 in place of directly using the position and orientation information calculated by the convergence arithmetic unit 1213. That is, the CG rendering unit 1215 builds up a virtual space using data registered in a CG contents database 213. Then, the CG rendering unit 1215 generates, as a virtual space image, an image which is obtained when the built-up virtual space is viewed from a viewpoint having a position and orientation indicated by the position and orientation information corrected by the position and orientation information correction unit 1214. The CG rendering unit 1215 then outputs the generated virtual space image to the HMD 1201 via a communication channel 203.

An image composition unit 214 generates a composite image by compositing the virtual space image transmitted from the image processing apparatus 1202 via the communication channel 203, and the display image clipped by the sensed image clipping unit 1209. This composite image undergoes image processing by a display image processing unit 215. The composite image that has undergone the image processing is displayed by a display unit 216.

With the aforementioned processing, a time delay from image sensing until display can be eliminated, thus enhancing realtimeness.

The processing for clipping a display image from a sensed image will be described below.

Figure 13A:
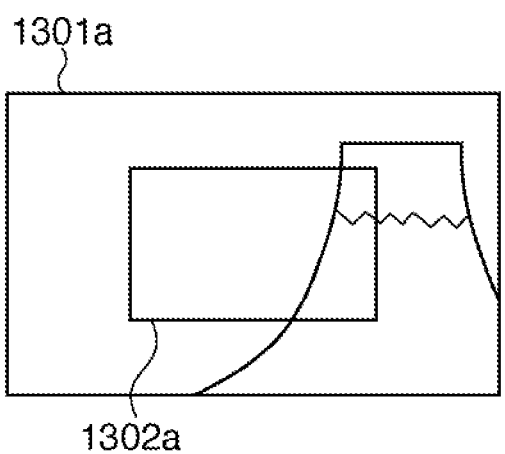
FIGS. 13A and 13B are views for explaining processing for clipping a display image from a sensed image.
Figure 13B:
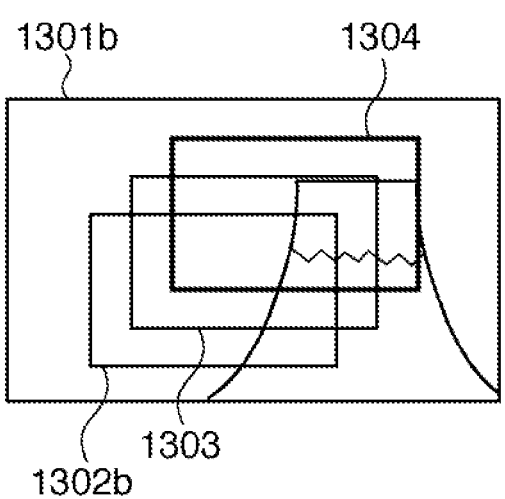

FIGS. 13A and 13B are views for explaining the processing for clipping a display image from a sensed image.

Referring to FIG. 13A, reference numeral 1301*a* denotes a sensed image of the current frame, which is sensed by the sensing unit 204; and 1302*a*, a display region in the sensed image 1301*a* of the current frame. On the other hand, referring to FIG. 13B, reference numeral 1301*b* denotes a sensed image of a frame at a certain timing after the current frame (subsequent frame). When the position and orientation of the sensing unit 204 have changed during an interval from the current frame until the subsequent frame, contents in the sensed image have naturally moved in the image. This is obvious since the same contents as those in the region 1302*a* have moved to those in a region 1302*b* in the sensed image 1301*b*. Note that reference numeral 1303 denotes a region which positionally corresponds to the region 1302*a* in the sensed image 1301*b*.

Since processing for generating a virtual space image based on the subsequent frame requires much time, a region to be composited with the virtual space image in the sensed image of the subsequent frame has deviated from a region (region 1303), which was clipped from the sensed image of the subsequent frame as in the first embodiment.

In this embodiment, the motion prediction unit 1208 executes the following processing in consideration of this point.

The motion detection unit 1207 calculates a motion amount $\Delta D$ in the sensed image 1301*b*. Since this motion amount $\Delta D$ is a registration error amount (including a registration error direction) between the regions 1302*a* and 1303, this registration error amount is calculated as the motion amount $\Delta D$. Letting $\Delta T$ be a time between the current frame and subsequent frame, and Δt be a time from the subsequent frame until the composition timing, a region R on the sensed image 1301b, which is to be composited with the virtual space image generated based on the sensed image 1301b, is calculated as follows. That is, the region R is obtained when the region 1303 is moved in a direction opposite to that indicated by ΔD by an amount as a product of the magnitude of ΔD and Δt/ΔT. This region R is a region 1304.

The sensed image clipping unit 1209 clips, as a display image, an image in the region 1304 from the sensed image 1301b, and outputs the clipped image to the image composition unit 214.

The processing to be executed by the index priority setting unit 1212 will be described in more detail below.

FIG. 14 is a view for explaining processing upon making priority settings based on a motion amount.

Reference numeral 1401a denotes a sensed image of a certain frame (frame 1); and 1401b, a sensed image of a frame (frame 2) after frame 1. Also, reference numeral 1401c denotes a sensed image of a frame (frame 3) after frame 2; and 1401d, a sensed image of a frame (frame 4) after frame 2.

Reference numerals 1402a, 1402b, 1402c, and 1402d denote display regions; and 1403a, 1403b, 1403c, and 1403d, non-display regions. As described above, the priority for an index in the display region is higher than that for an index in the non-display region.

When an index, which is preferentially used in calculation of position and orientation information, is changed to another index, a problem of a nonconstant processing time and that of deviation of the rendering position of a virtual space image due to an arithmetic timing difference are posed. For example, when the HMD user has moved, if the priority setting processing described in the first embodiment (FIGS. 7A and 7B) is executed, the priorities of indices may be frequently changed, resulting in a state in which indices used in calculation of position and orientation information frequently change. In order to eliminate occurrence of such state, when the motion amount is equal to or larger than a predetermined value, the currently used priorities of indices are inhibited from being changed.

For example, since the priority for an index 1404a in the sensed image 1401a is higher than that for an index 1405a, the convergence arithmetic unit 1213 executes arithmetic processing of position and orientation information using only the index 1404a.

Assume that the head of the user has moved after the sensed image 1401a was sensed, and the sensed image 1401b is sensed. In this case, in the sensed image 1401b, since the index 1404a has moved from the display region 1402b into the non-display region 1403b, the priority of the index 1404a is updated to a lower value according to the priority setting processing of the first embodiment. In this embodiment, when the motion amount in the sensed image 1401b is equal to or larger than a threshold, the priority of this index 1404a is not changed. In the sensed image 1401b, since the index 1405a has moved from the non-display region 1403b into the display region 1402b, the priority of the index 1405a is updated to a higher value in this embodiment. Note that in this embodiment, since only the index 1404a is used in calculation of position and orientation information, if the motion amount is equal to or larger than the threshold, the priority of this index 1404a is inhibited from being changed. However, when the index 1405a is also used in calculation of position and orientation information, if the motion amount is equal to or larger than the threshold, the priority of this index 1405a is also inhibited from being changed.

Next, assume that the sensed image 1401c is sensed after the sensed image 1401b was sensed. Furthermore, assume that the head of the user barely moved after sensing of the sensed image 1401b until that of the sensed image 1401c. In such case, the same processing as in the first embodiment is executed. In this case, since the index 1404a is located within the non-display region 1403c, the priority of this index 1404a is changed to that according to the non-display region 1403c. Also, since the index 1405a is located within the display region 1402c, the priority of this index 1405a is changed to that according to the display region 1402c.

Also, assume that the head of the user has moved to the right after sensing of the sensed image 1401b and, after that, the sensed image 1401d is sensed. When the index 1404a is located at a position very close to the edge of the sensed image 1401d, or falls outside the sensed image 1401d, the priority of the index 1404a is excluded from those to be changed. In this case, the priority of an index 1406a, which is close to the moving direction and can be continuously used without falling outside the frame if a motion continues, is changed to be higher.

FIG. 15 is a flowchart of processing in the HMD 1201 for settling a display image, generating position and orientation information, and transmitting the position and orientation information to the image processing apparatus 1202. Note that since the processing according to the flowchart shown in FIG. 15 is that for generating a composite image for one frame, it is repeated for respective frames in practice.

In step S1501, the sensing unit 204 senses an image of the physical space, and outputs the sensed image to the frame buffer 1210, motion detection unit 1207, and index extraction unit 209.

In step S1502, the motion detection unit 1207 and motion prediction unit 1208 settle a display image to be clipped from the sensed image acquired in step S1501. Details of the processing in step S1502 will be described later using FIG. 18.

In step S1503, the index extraction unit 209 detects indices from the sensed image acquired from the sensing unit 204. Note that steps S1502 and S1503 may be executed in parallel.

In step S1504, the index priority setting unit 1212 sets priorities for the respective indices extracted by the index extraction unit 209. Details of the processing in step S1504 will be described later using FIG. 19.

In step S1505, the convergence arithmetic unit 1213 executes the same processing as in the first embodiment to calculate the position and orientation information of the sensing unit 204. In this embodiment, the convergence arithmetic unit 1213 uses only specific indices in turn from those in descending order of priority.

In step S1506, the position and orientation information correction unit 1214 corrects the position and orientation information calculated by the convergence arithmetic unit 1213 in step S1505, as described above.

In step S1507, the position and orientation information correction unit 1214 transmits the position and orientation information corrected in step S1506 to the image processing apparatus 1202 via the communication channel 203.

The process returns to step S1501 to execute the subsequent processes for the next frame.

Figure 16:
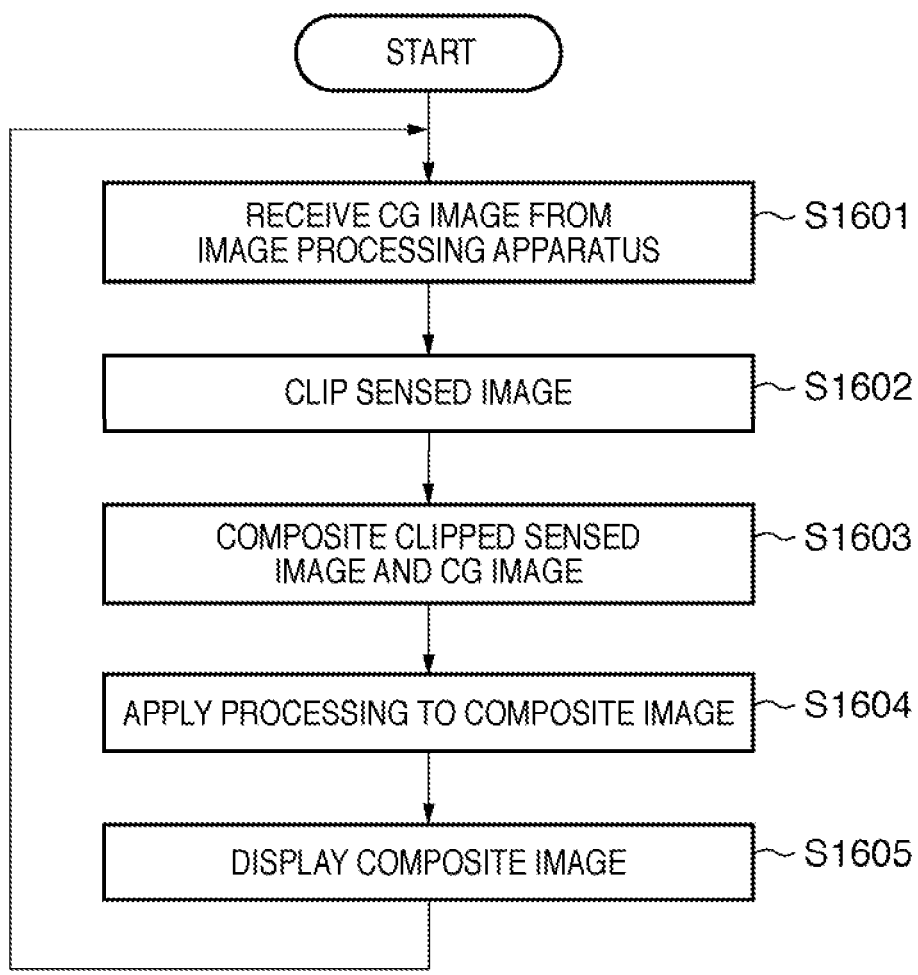
FIG. 16 is a flowchart of processing for generating and displaying a composite image for one frame in the HMD 1201.

FIG. 16 is a flowchart of processing for generating and displaying a composite image for one frame in the HMD 1201. Note that since the processing according to the flowchart shown in FIG. 16 is that for a composite image for one frame, it is repeated for respective frames in practice.

In step S1601, the image composition unit 214 receives a virtual space image transmitted from the image processing apparatus 1202 via the communication channel 203.

In step S1602, the sensed image clipping unit 1209 clips, as a display image, the image in the region specified by the motion prediction unit 1208 in step S1502 from the sensed image acquired in step S1501.

In step S1603, the image composition unit 214 generates a composite image by compositing the display image clipped by the sensed image clipping unit 1209 in step S1602 and the virtual space image received from the image processing apparatus 1202 in step S1601.

In step S1604, the display image processing unit 215 applies the same image processing as in the first embodiment to the composite image generated in step S1603.

In step S1605, the display unit 216 displays the composite image that has undergone the image processing in step S1604.

Figure 17:
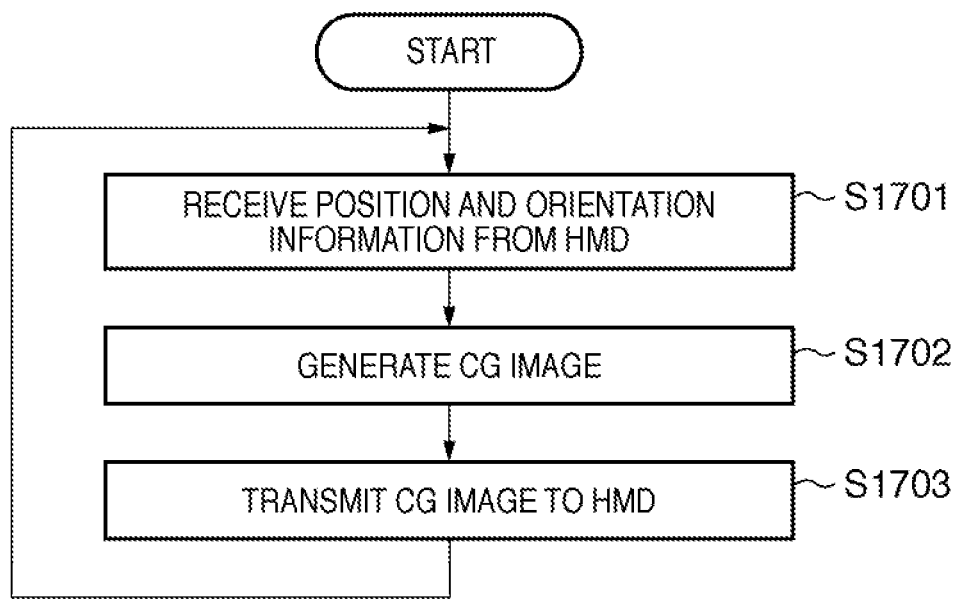
FIG. 17 is a flowchart of processing executed by the image processing apparatus 1202.

FIG. 17 is a flowchart of processing executed by the image processing apparatus 1202. Note that since the processing according to the flowchart shown in FIG. 17 is that for generating a virtual space image for one frame, it is repeated for respective frames, in practice.

In step S1701, the CG rendering unit 1215 receives position and orientation information from the HMD 1201 via the communication channel 203.

In step S1702, the CG rendering unit 1215 generates a virtual space image using the data registered in the CG contents database 213 and the position and orientation information received in step S1701 as in the first embodiment.

In step S1703, the CG rendering unit 1215 transmits the virtual space image generated in step S1702 to the HMD 1201 via the communication channel 203.

Figure 18:
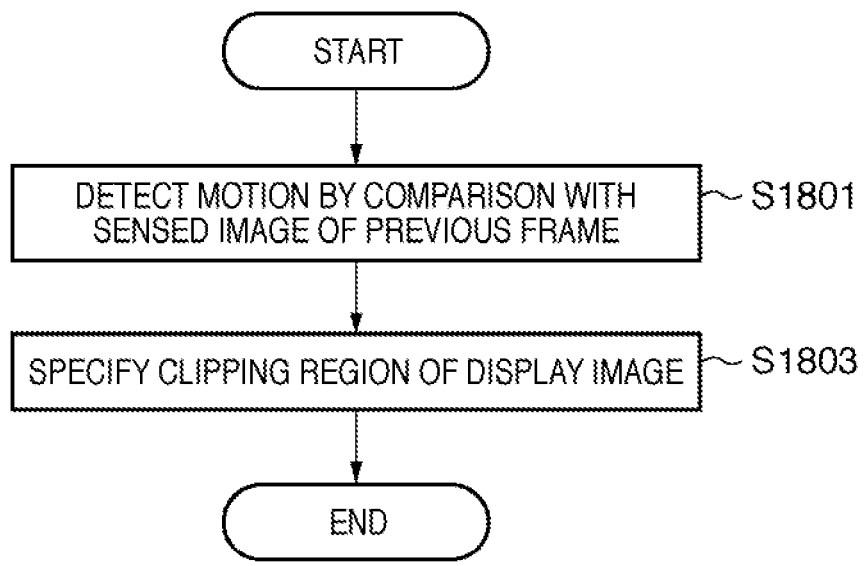
FIG. 18 is a flowchart showing details of processing in step S1502.

FIG. 18 is a flowchart showing details of the processing in step S1502. In step S1801, the motion detection unit 1207 calculates a motion amount in the sensed image of the current frame using the sensed image of the current frame acquired in step S1501, and a sensed image of a frame immediately before the current frame, which is stored in the frame buffer 1210.

In step S1803, the motion prediction unit 1208 specifies a region required to clip a display image in the sensed image of the current frame by executing the aforementioned processing.

Figure 19:
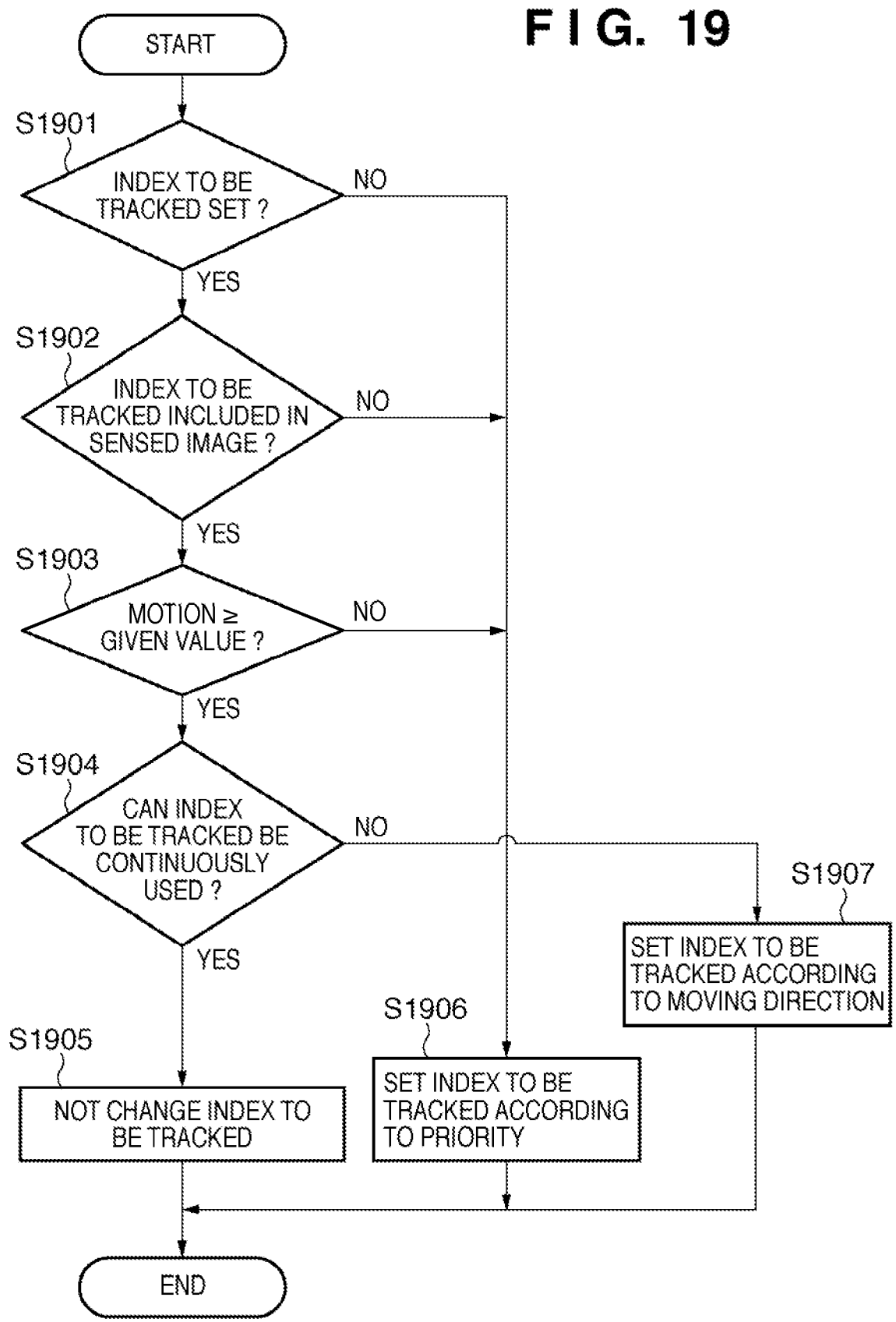
FIG. 19 is a flowchart showing details of processing in step S1504.

FIG. 19 is a flowchart showing details of the processing in step S1504. Note that since the processing in step S1504 is executed in the index priority setting unit 1212, as described above, the index priority setting unit 1212 executes all processes in respective steps shown in FIG. 19, as a matter of course.

The index priority setting unit 1212 checks in step S1901 whether or not there is an index which is used (to be used) in generation of position and orientation information currently (whether or not there is a currently tracked index). As a result of checking, if there is a currently tracked index, the process advances to step S1902; otherwise, the process jumps to step S1906.

Next, the index priority setting unit 1212 checks in step S1902 whether or not the sensed image includes an index to be tracked, in consideration of a case in which an index to be tracked, which is confirmed in the previous step falls outside the sensed image owing to a motion of the sensing unit 204. If the sensed image includes an index to be tracked, the process advances to step S1903; otherwise, the process jumps to step S1906.

The index priority setting unit 1212 checks in step S1903 whether or not the motion amount calculated by the motion detection unit 1207 is equal to or larger than the threshold. As a result of checking, if the motion amount is equal to or larger than the threshold, the process advances to step S1904. On the other hand, if the motion amount is smaller than the threshold, the process jumps to step S1906.

The index priority setting unit 1212 checks in step S1904 whether or not the index to be tracked can be continuously used without falling outside the sensed image after another motion, by seeing whether or not the index to be tracked is separated by a predetermined distance or more from the edge of the sensed image. If it is determined that the index to be tracked can be continuously used, the process advances to step S1905; otherwise, the process advances to step S1907.

In step S1905, the index priority setting unit 1212 inhibits the priority of the currently tracked index from being changed.

On the other hand, in step S1906 the index priority setting unit 1212 changes the priority of the currently tracked index as in the first embodiment.

In step S1907, the index priority setting unit 1212 sets an index which is close to an end of the image in the moving direction of the sensing unit 204 indicated by the motion amount calculated by the motion detection unit 1207 as an index to be tracked, and re-sets the priority.

As described above, according to this embodiment, in the arrangement that enhances realtimeness by eliminating a time delay from image sensing until display, a deviation of the rendering position of the virtual space image due to frequent switching of an index used in generation of position and orientation information can be reduced.

Note that this embodiment has explained the method of executing motion detection using sensed images. However, a method using a three-dimensional position and orientation sensor such as a gyro sensor or magnetic sensor attached to the apparatus or a method using such sensor together with the method of this embodiment may be used. In this case, the three-dimensional position and orientation sensor is attached to the HMD, and motion information detected by this sensor is sent to the motion prediction unit 1208, thus executing motion prediction. When motion prediction is executed using a sensor alone, the motion detection unit 1207 and frame buffer 1210 can be omitted.

Third Embodiment

A system according to this embodiment includes a sensing unit used to sense an image of a physical space seen from the vicinity of the right eye of the user, and a sensing unit used to sense an image of the physical space seen from the vicinity of the left eye. Note that the fields of view of the respective sensing units do not overlap each other. That is, sensed images by the respective sensing units do not redundantly include the same landscape. As a result, the field of view required to detect indices can be further broadened.

Figure 20:
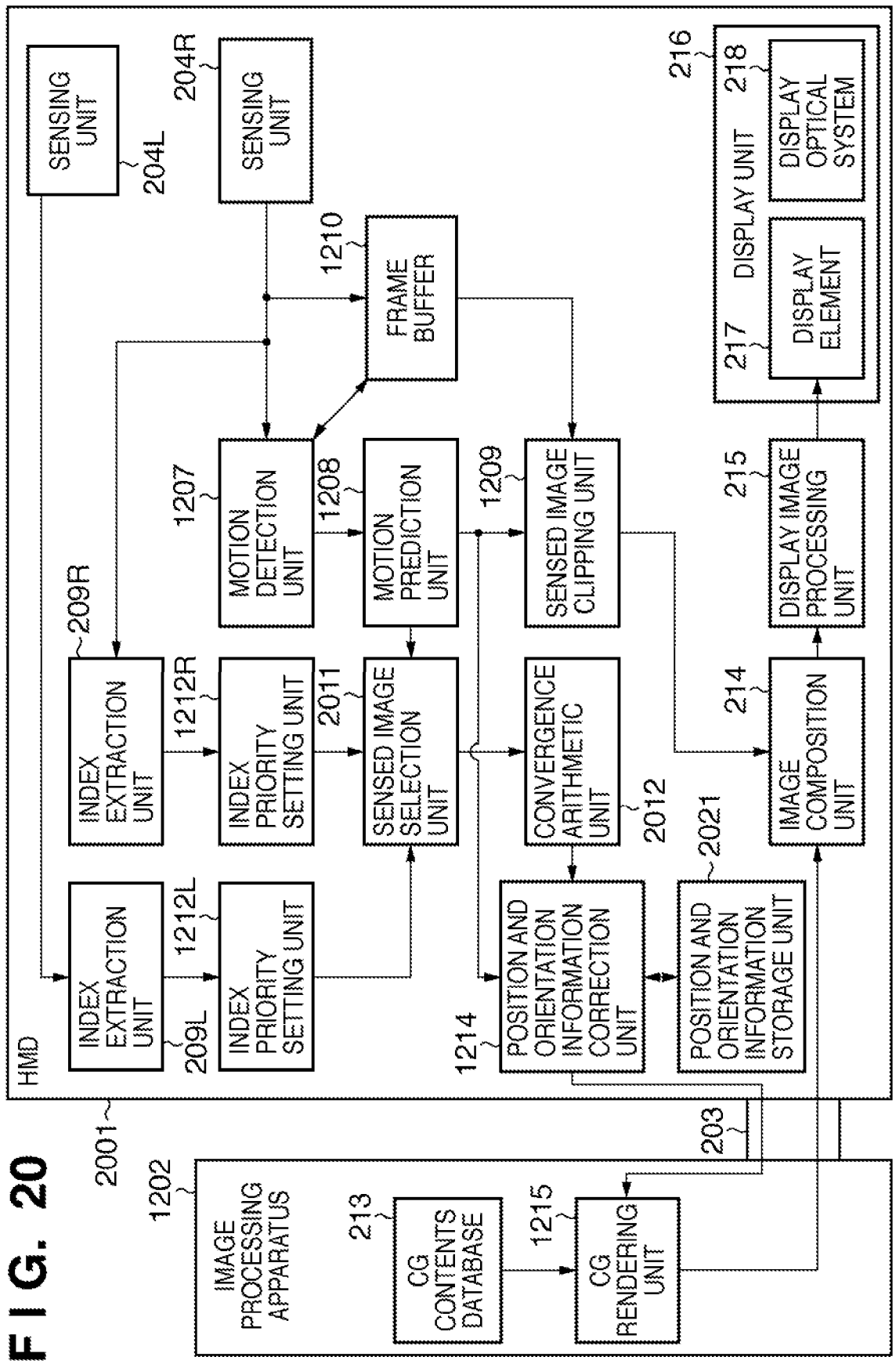
FIG. 20 is a block diagram showing an example of the functional arrangement of a system according to the third embodiment of the present invention.

FIG. 20 is a block diagram showing an example of the functional arrangement of a system according to this embodiment. Note that the same reference numerals denote the same units as those shown in FIG. 12 in respective units shown in FIG. 20. As shown in FIG. 20, the system according to this embodiment includes an image processing apparatus 1202 and HMD 2001. That is, in the system according to this embodiment, only the HMD 2001 is different from the second embodiment. Therefore, the HMD 2001 will be explained below.

In the HMD 2001, the arrangement of the HMD 1201 is modified as follows. The sensing unit 204, index extraction unit 209, and index priority setting unit 1212 shown in FIG. 12 are separated into those for the right and left eyes in the HMD 2001. In FIG. 20, reference numerals with "R" denote units for the right eye of the user, and those with "L" denote units for the left eye of the user.

Furthermore, in the HMD 2001, a sensed image selection unit 2011 and position and orientation information storage unit 2021 are added to the HMD 1201. The operation of a convergence arithmetic unit 2012 is the same as the convergence arithmetic unit 1213 of the second embodiment, except that the convergence arithmetic unit 2012 calculates position and orientation information based on information of indices from a sensed image selected by the sensed image selection unit 2011.

Note that the sensed image clipping unit 1209, CG rendering unit 1215, image composition unit 214, display image processing unit 215, and display unit 216 are shared by the right and left eyes, but they may be provided in correspondence with the right and left eyes.

A characteristic feature of the arrangement of the HMD 2001 will be described below. Assume that points which are not particularly described in the following description are the same as those in the second embodiment.

Each of sensing units 204R and 204L senses a physical space image in the corresponding field of view by executing the same processing as in the sensing unit 204. Note that the optical axes of the respective sensing units 204R and 204L are adjusted in advance, so that the fields of view of the sensing units 204R and 204L do not overlap each other, so as to sense a broader physical space image and to put more indices in the fields of view as much as possible, as described above.

The sensing unit 204L outputs the sensed image to a subsequent index extraction unit 209L. The sensing unit 204R outputs the sensed image to a subsequent index extraction unit 209R, motion detection unit 1207, and frame buffer 1210.

The index extraction units 209R and 209L respectively detect indices from the sensed images received from the sensing units 204R and 204L as in the first embodiment.

Index priority setting units 1212R and 1212L respectively set priorities for the respective indices, as in the second embodiment.

The sensed image selection unit 2011 executes the following determination processing based on the numbers of indices (detection results) and priorities, which are respectively obtained for the right and left sensed images by the index extraction units 209R and 209L and the index priority setting units 1212R and 1212L, and a motion amount calculated by the motion detection unit 1207. That is, the sensed image selection unit 2011 selects a sensed image used by the convergence arithmetic unit 2012 to calculate position and orientation information from the sensed image for the right eye (an image sensed by the sensing unit 204R) and the sensed image for the left eye (an image sensed by the sensing unit 204L). Note that this sensed image selection unit 2011 may be removed, and the convergence arithmetic unit 2012 may calculate position and orientation information using both the right and left sensed images. However, with this arrangement, the number of arithmetic processes that cause a delay increases, and the circuit scale also increases. For this reason, the sensed image selection unit 2011 is necessary in this embodiment.

The position and orientation information storage unit 2021 stores pieces of position and orientation information calculated by a position and orientation information correction unit 1214 for respective previous frames.

A large difference between this embodiment and the second embodiment lies in that the right and left sensing units respectively sense physical space images, and the sensed image selection unit 2011 selects either of the right and left sensed images to be used in generation of position and orientation information.

Figure 21:
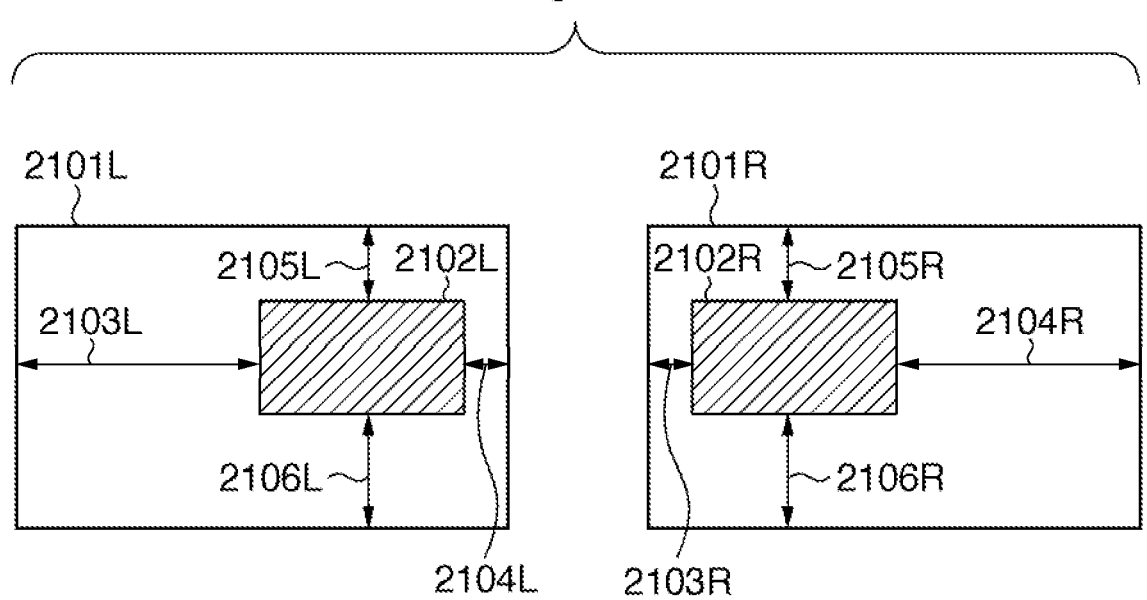
FIG. 21 is a view for explaining display regions in right and left sensed images.

FIG. 21 is a view for explaining display regions in the right and left sensed images. Reference numeral 2101L denotes a sensed image for the left eye; and 2101R, a sensed image for the right eye. Reference numeral 2102L denotes a display region in the sensed image 2101L for the left eye; and 2102R, a display region in the sensed image 2101R for the right eye.

Reference numeral 2105L denotes a distance from the top end of the sensed image 2101L to that of the display region 2102L; and 2106L, a distance from the bottom end of the sensed image 2101L to that of the display region 2102L. Reference numeral 2103L denotes a distance from the left end of the sensed image 2101L to that of the display region 2102L; and 2104L, a distance from the right end of the sensed image 2101L to that of the display region 2102L.

Reference numeral 2105R denotes a distance from the top end of the sensed image 2101R to that of the display region 2102R; and 2106R, a distance from the bottom end of the sensed image 2101R to that of the display region 2102R. Reference numeral 2103R denotes a distance from the left end of the sensed image 2101R to that of the display region 2102R; and 2104R, a distance from the right end of the sensed image 2101R to that of the display region 2102R.

In a video see-through HMD in which the display field angle equals the image sensing field angle, it is a common practice to design the axes of optical systems so that right and left sensed images overlap each other by a certain visual distance, so as to allow the user to fuse images. On the other hand, in this embodiment, since a sensed image is larger than a display image, and non-display regions of the right and left sensed images need not overlap each other, the right and left sensed images may have different positions of display regions. For example, as shown in FIG. 21, the positions of the display regions may be different in the right and left sensed images like distance 2103L>distance 2103R. By setting distance 2103R<distance 2103L and distance 2104L<distance 2104R, areas that allow detection of indices can be broadened in the right-and-left direction. As for the distances 2105L and 2106L, for example, if use in an environment in which more indices are laid out toward the bottom is assumed, distance 2105L<distance 2106L may be set. The same applies to the distances 2105R and 2106R.

In this manner, the positions of the display regions in the right and left sensed images are determined in advance as needed.

Figure 22:
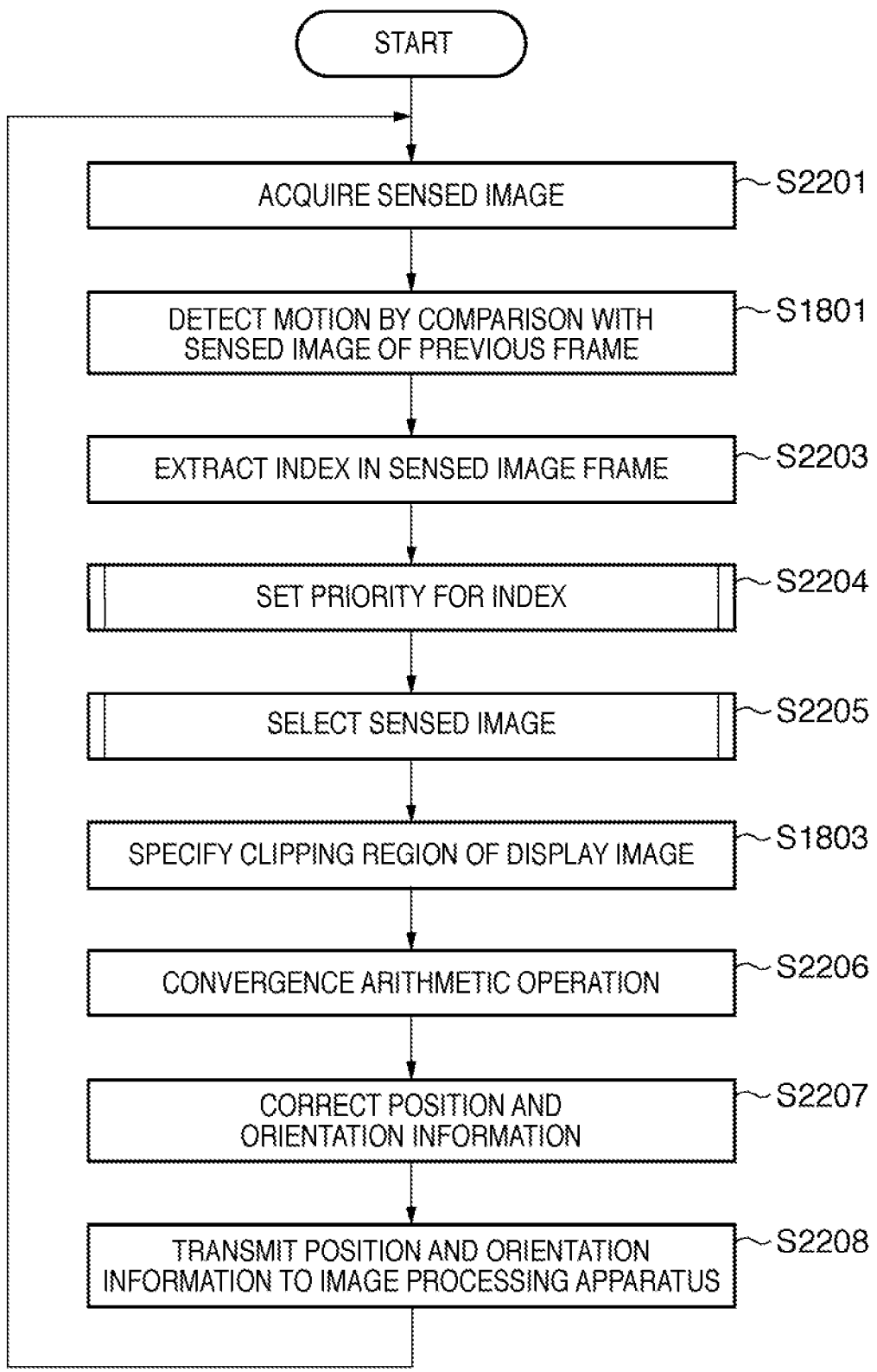
FIG. 22 is a flowchart of processing in an HMD 2001 for settling a display image, generating position and orientation information, and transmitting the position and orientation information to an image processing apparatus 1202.

FIG. 22 is a flowchart of processing in the HMD 2001 for settling a display image, generating position and orientation information, and transmitting the position and orientation information to the image processing apparatus 1202. Note that since the processing according to the flowchart shown in FIG. 22 is that for generating a composite image for one frame, it is repeated for respective frames in practice.

In step S2201, the sensing units 204R and 204L respectively sense images of the physical space, and output the sensed images to the frame buffer 1210, motion detection unit 1207, and index extraction units 209R and 209L.

Next, by executing the processing in step S1801, a motion amount is calculated.

In step S2203, the index extraction units 209R and 209L respectively detect indices from the sensed images acquired from the sensing units 204R and 204L. Note that steps S1801 and S2203 may be executed in parallel.

In step S2204, the index priority setting units 1212R and 1212L respectively set priorities for the respective indices extracted by the index extraction units 209R and 209L. In the processing of this step, the processing in step S1504 is executed for the right and left sensed images.

In step S2205, the sensed image selection unit 2011 executes processing for selecting one of the right and left sensed images. Details of the processing in step S2205 will be described later using FIGS. 25A and 25B.

In step S1803, the motion detection unit 1207 and motion prediction unit 1208 settle a display image to be clipped from the sensed image selected in step S2205.

In step S2206, when the sensed image selection unit 2011 selects the sensed image for the right eye, the convergence arithmetic unit 2012 calculates the position and orientation information of the sensing unit 204R by executing the same processing as in the second embodiment using the indices extracted from the sensed image for the right eye. On the other hand, when the sensed image selection unit 2011 selects the sensed image for the left eye, the convergence arithmetic unit 2012 calculates the position and orientation information of the sensing unit 204L by executing the same processing as in the second embodiment using the indices extracted from the sensed image for the left eye.

In step S2207, the position and orientation information correction unit 1214 corrects the position and orientation information calculated by the convergence arithmetic unit 2012 in step S2206, as described above.

In step S2208, the position and orientation information correction unit 1214 transmits the position and orientation information corrected in step S2207 to the image processing apparatus 1202 via the communication channel 203.

Figure 23:
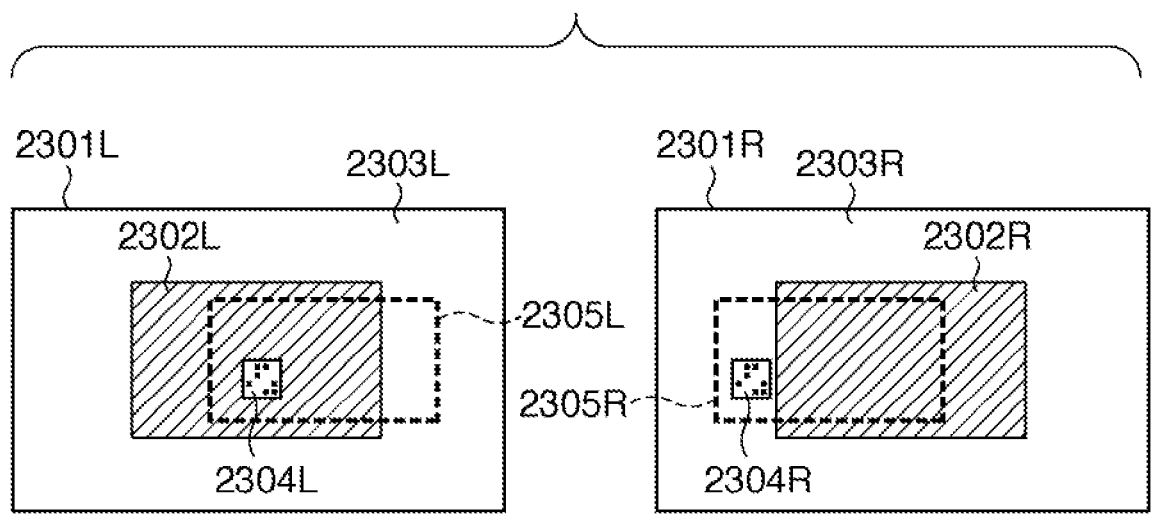
FIG. 23 is a view for explaining selection control of a sensed image used to generate position and orientation information when the HMD user has moved.

The process then returns to step S2201 to execute the subsequent processes for the next frame. FIG. 23 is a view for explaining selection control of a sensed image used in generation of position and orientation information when the HMD user has moved.

Reference numeral 2301L denotes a sensed image for the left eye. Reference numeral 2302L denotes a region having a higher priority (than a region 2303L) in the sensed image 2301L; and 2303L, a region having a lower priority (than the region 2302L) in the sensed image 2301L. Reference numeral 2305L denotes a frame of a display region in the sensed image 2301L. Reference numeral 2304L denotes an index which appears in the sensed image 2301L. In FIG. 23, this index 2304L is located within the high-priority region 2302L and the display region 2305L.

On the other hand, reference numeral 2301R denotes a sensed image for the right eye. Reference numeral 2302R denotes a region having a higher priority (than a region 2303R) in the sensed image 2301R; and 2303R, a region having a lower priority (than the region 2302R) in the sensed image 2301R. Reference numeral 2305R denotes a frame of a display region in the sensed image 2301R. Reference numeral 2304R denotes an index which appears in the sensed image 2301R. In FIG. 23, this index 2304R is located within the low-priority region 2303R and the display region 2305R.

Switching of the right or left sensed image used in calculation of position and orientation information is desirably limited since it causes occurrence of a deviation of the rendering position of a virtual space image. When the HMD 2001 moves, if an index in either the right or left sensed image used to calculate position and orientation information is located at a position where it readily falls outside the sensed image, the same sensed image cannot be continuously used. For this reason, when the HMD 2001 has a predetermined motion amount or more, the sensed image selection unit 2011 selects a sensed image including an index which is closer to the moving direction.

When the moving direction is the left direction, although the sensed image 2301L includes an index which is located within the high-priority region, the sensed image 2301R includes an index closer to the left end of the sensed image (since the moving direction is the left direction; the right end if the moving direction is the right direction). Therefore, the sensed image selection unit 2011 selects the sensed image 2301R. Conversely, when the moving direction is the right direction, the sensed image selection unit 2011 selects the left sensed image including the index 2304 closer to the right side as the moving direction.

Figure 24:
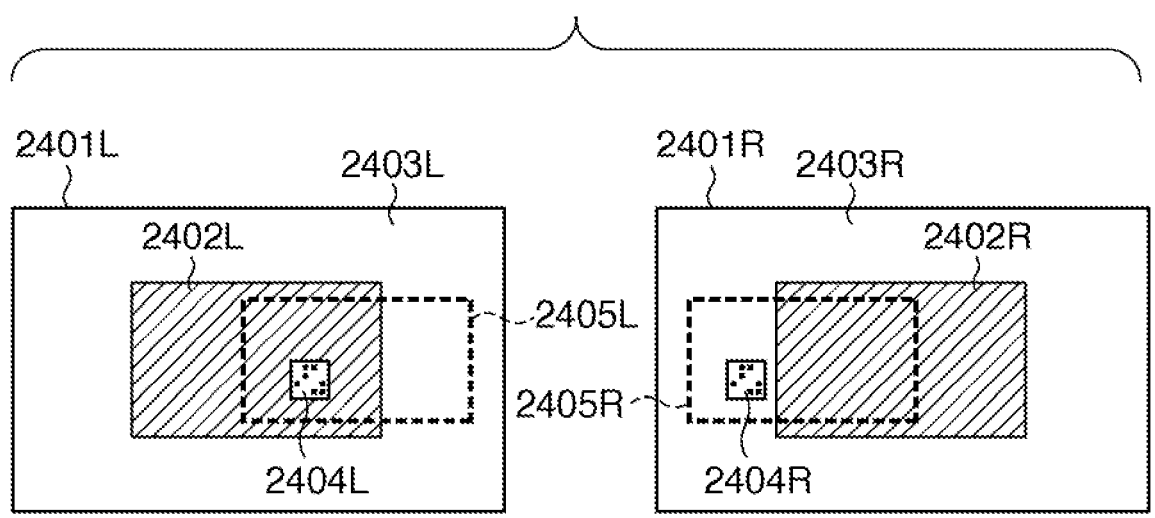
FIG. 24 is a view showing another example of selection control of a sensed image used to generate position and orientation information.

FIG. 24 is a view for explaining another example of the selection control of a sensed image used to generate position and orientation information.

Reference numeral 2401L denotes a sensed image for the left eye. Reference numeral 2402L denotes a region having a higher priority (than a region 2403L) in the sensed image 2401L; and 2403L, a region having a lower priority (than the region 2402L) in the sensed image 2401L. Reference numeral 2405L denotes a frame of a display region in the sensed image 2401L. Reference numeral 2404L denotes an index which appears in the sensed image 2401L. In FIG. 24, this index 2404L is located within the high-priority region 2402L and the display region 2405L.

On the other hand, reference numeral 2401R denotes a sensed image for the right eye. Reference numeral 2402R denotes a region having a higher priority (than a region 2403R) in the sensed image 2401R; and 2403R, a region having a lower priority (than the region 2402R) in the sensed image 2401R. Reference numeral 2405R denotes a frame of a display region in the sensed image 2401R. Reference numeral 2404R denotes an index which appears in the sensed image 2401R. In FIG. 24, this index 2404R is located within the low-priority region 2403R and the display region 2405R.

As described above, since position and orientation information with higher precision can be generated using an index closer to the center of a sensed image region, it is desirable to use a sensed image having an index closer to the center in calculation of position and orientation information. Thus, when the indices 2404R and 2404L of the right and left sensed images have different priorities, a sensed image including an index having a higher priority is used. As described above, in FIG. 24, the index 2404L is located within the high-priority region 2402L, and the index 2404R is located within the low-priority region 2403R. Hence, the sensed image 2401L including the index 2404L is selected as an image used to generate position and orientation information.

Since a sensed image including a larger number of indices is used to suppress switching of the right or left sensed image used to calculate position and orientation information, a sensed image including a larger number of indices having a high priority may be used. When the numbers of indices having a high priority are equal to each other, a sensed image including a larger number of indices having the next highest priority is used.

Figure 25A:
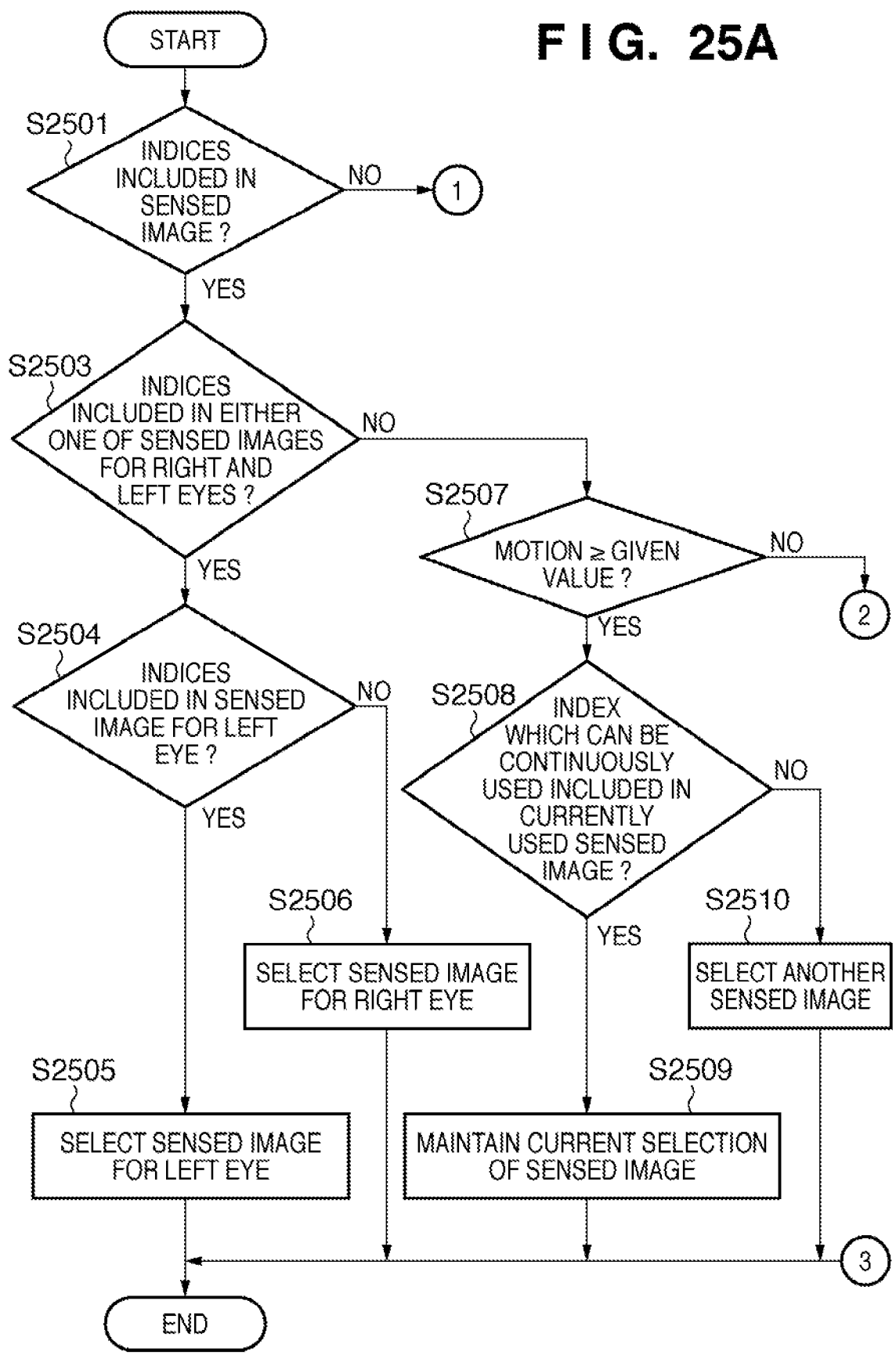
FIGS. 25A and 25B are flowcharts each showing details of processing in step S2205.
Figure 25B:
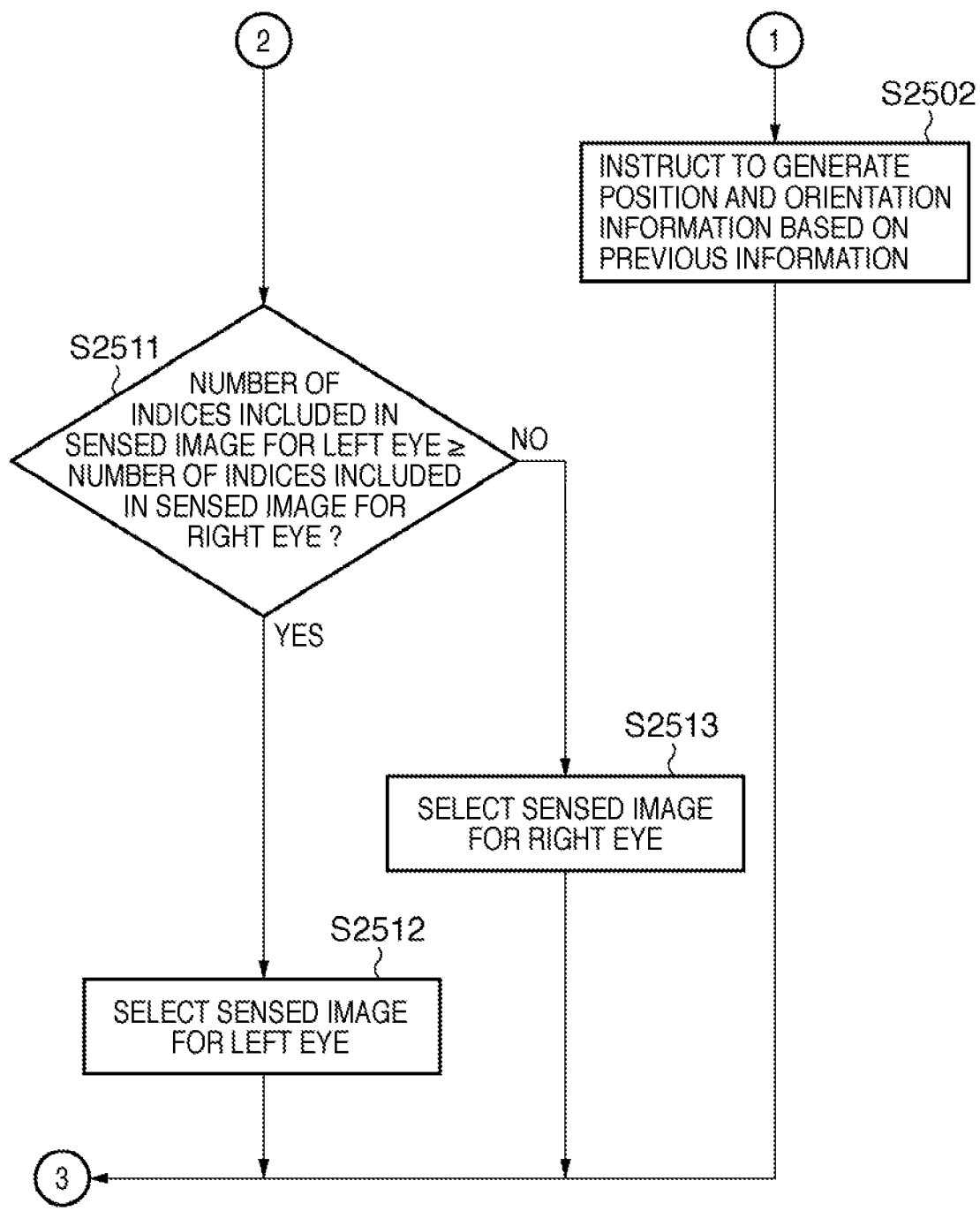

FIGS. 25A and 25B are flowcharts each showing details of the processing in step S2205.

The sensed image selection unit 2011 checks in step S2501, with reference to the numbers of indices detected by the index extraction units 209R and 209L, whether or not either of the numbers of indices is equal to or larger than 1. That is, the sensed image selection unit 2011 checks whether or not at least one of the sensed images for the right and left eyes includes one or more indices. As a result of checking, if at least one of the sensed images for the right and left eyes includes one or more indices, the process advances to step S2503; otherwise, the process advances to step S2502.

In step S2502, the sensed image selection unit 2011 instructs the convergence arithmetic unit 2012 and the position and orientation information correction unit 1214 to generate position and orientation information using the position and orientation information stored in the position and orientation information storage unit 2021 and the motion amount calculated by the motion prediction unit 1208.

On the other hand, the sensed image selection unit 2011 checks in step S2503 whether or not only one of the sensed images for the right and left eyes includes one or more indices. This checking processing can be attained by seeing, with reference to the numbers of indices detected by the index extraction units 209R and 209L, whether or not the number of indices included in one image is zero and the number of indices included in the other image is 1 or more. As a result of checking, if only one sensed image includes one or more indices, the process advances to step S2504; if both the sensed images include one or more indices, the process advances to step S2507.

The sensed image selection unit 2011 checks in step S2504 whether or not only the sensed image for the left eye includes one or more indices. This checking processing can be attained by seeing whether or not the number of indices detected by the index extraction unit 209R is zero, and the number of indices detected by the index extraction unit 209L is 1 or more. As a result of checking, if only the sensed image for the left eye includes one or more indices, the process advances to step S2505; if only the sensed image for the right eye includes one or more indices, the process advances to step S2506.

In step S2505, the sensed image selection unit 2011 selects the sensed image for the left eye as that used to generate position and orientation information.

On the other hand, in step S2506 the sensed image selection unit 2011 selects the sensed image for the right eye as that used to generate position and orientation information.

The sensed image selection unit 2011 checks in step S2507 if the motion amount calculated by the motion prediction unit 1208 is equal to or larger than a threshold. As a result of checking, if the motion amount is equal to or larger than the threshold, the process advances to step S2508; otherwise, the process advances to step S2511.

The sensed image selection unit 2011 checks in step S2508 whether or not the sensed image currently used to generate position and orientation information includes an index which can be continuously used. This checking processing is attained by seeing whether or not an index of the currently used sensed image is closer to the end of the moving direction detected by the motion detection unit 1207 than that of the other sensed image. With this checking processing, if it is determined that the currently used sensed image includes an index that can be used continuously, the process advances to step S2509; otherwise, the process advances to step S2510.

In step S2509, the sensed image selection unit 2011 selects the sensed image currently used to generate position and orientation information.

On the other hand, in step S2510 the sensed image selection unit 2011 selects the sensed image, which is not currently used to generate position and orientation information.

In step S2511, the sensed image selection unit 2011 compares the number x of indices detected from a high-priority region of those detected by the index extraction unit 209R with the number y of indices detected from a high-priority region of those detected by the index extraction unit 209L. Then, the sensed image selection unit 2011 checks whether or not y≥x. If x=y, the sensed image selection unit 2011 compares the numbers of indices detected from the next highest-priority regions. If these numbers of indices are also equal to each other, the sensed image selection unit 2011 repeats comparison until the numbers of indices are different.

As a result of checking, if y≥x, the process advances to step S2512; if y<x, the process advances to step S2513.

In step S2512, the sensed image selection unit 2011 selects the sensed image for the left eye as that used to generate position and orientation information.

On the other hand, in step S2513 the sensed image selection unit 2011 selects the sensed image for the right eye as that used to generate position and orientation information.

As described above, according to this embodiment, since an area that allows detection of indices is further broadened, the interval between neighboring indices which are laid out on the physical space can be broadened.

Fourth Embodiment

A system according to this embodiment eliminates unnaturalness caused when virtual objects enter or leave a display image by controlling rendering processing of virtual objects according to the positions of indices in a sensed image. This arrangement is particularly effective when different coordinate spaces of virtual objects are respectively applied to respective indices.

Note that this embodiment may use any of the systems of the first to third embodiments.

Figure 26:
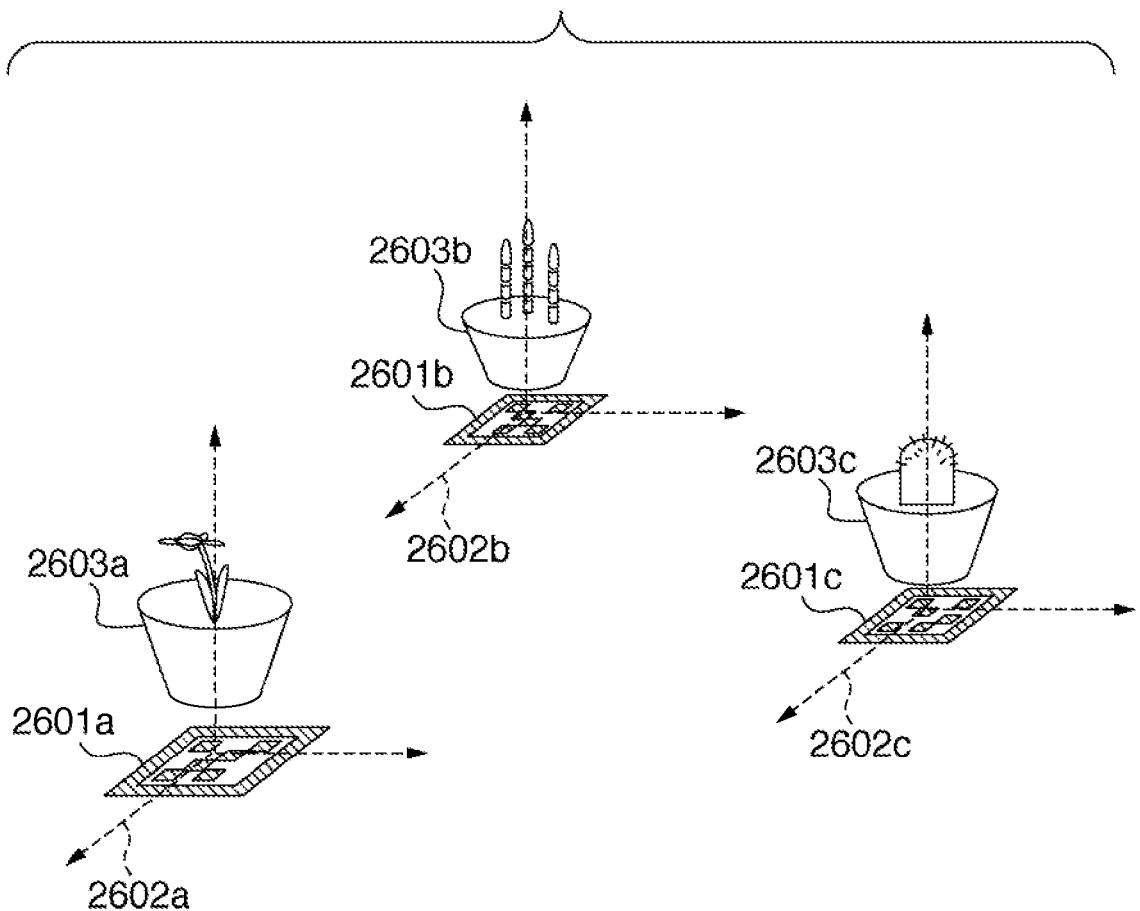
FIG. 26 is a view showing a state in which different virtual objects are associated with respective indices (markers), and the corresponding virtual objects are laid out at the positions of the respective indices.

FIG. 26 is a view showing a state in which different virtual objects are associated with respective indices (markers), and corresponding virtual objects are laid out at the positions of the respective indices.

Reference numerals 2601a, 2601b, and 2601c denote markers including two-dimensional barcodes. Reference numerals 2602a, 2602b, and 2602c respectively denote coordinate systems (three-dimensional coordinate axes) with reference to the markers 2601a, 2601b, and 2601c. Reference numerals 2603a, 2603b, and 2603c respectively denote virtual objects laid out on the coordinate systems 2602a, 2602b, and 2602c.

Since the coordinate systems 2602a, 2602b, and 2602c are independent from each other, each of the virtual objects 2603a, 2603b, and 2603c is not influenced by markers other than the corresponding marker. The description of this embodiment will be given under the assumption that the respective virtual objects respectively correspond to the different indices.

Figure 27:
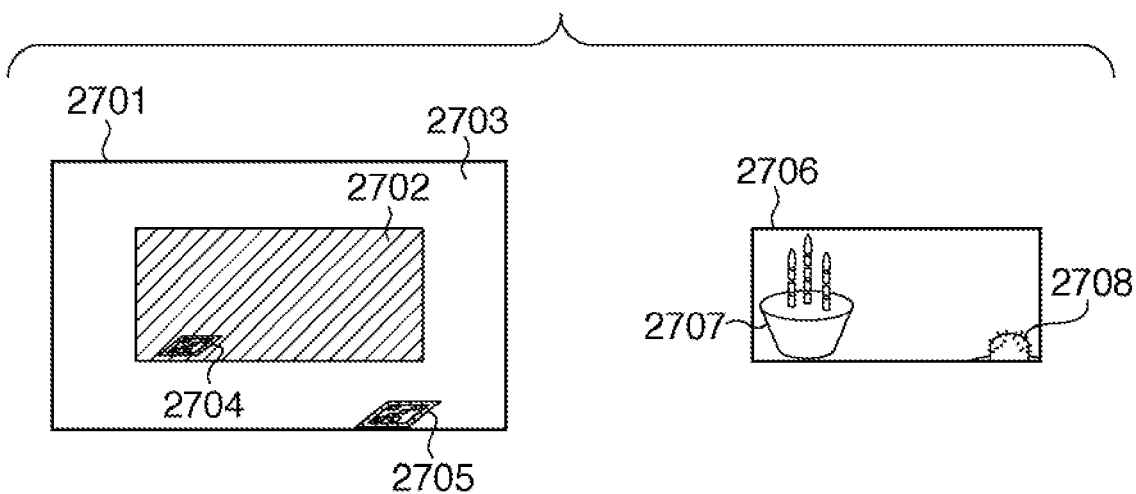
FIG. 27 is a view for explaining processing for controlling rendering processing of a virtual object to be laid out at the position of an index in a sensed image based on that position.

FIG. 27 is a view for explaining processing for controlling the rendering processing of a virtual object laid out at the position of an index in a sensed image based on that position.

Reference numeral 2701 denotes a sensed image. Reference numeral 2702 denotes a region which has a higher priority (than a region 2703) in the sensed image 2701, and is also a display region. Reference numeral 2703 denotes a region with a lower priority (than the region 2702) in the sensed image 2701. Reference numeral 2706 denotes a virtual space image within the display region. Reference numerals 2704 and 2705 denote indices included in the sensed image 2701. Since virtual objects are laid out the positions of these indices, a virtual object 2707 is laid out at the position of the index 2704, and a virtual object 2708 is laid out at the position of the index 2705, as shown in the virtual space image 2706.

As described in the first to third embodiments, even when the sensed image region is set to be broader than the display region, when the size of a virtual object is large, a phenomenon in which a moment when an index appears or disappears in or from the sensed image region, a virtual object is suddenly displayed or cleared accordingly often occurs. This phenomenon results in unnaturalness experienced by an observer. This embodiment controls the rendering processing of a virtual object laid out at the position of an index in the sensed image according to the position of the index, so as to eliminate this unnaturalness. This processing will be explained below taking FIG. 27 as an example.

A region of the sensed image 2701 is divided into the region 2702 with a high priority and the region 2703 with a low priority based on the distance from the display region. In this case, the region is divided into two regions, but it may be divided into three or more regions. The virtual object 2708, which is located within the low-priority region 2703 and corresponds to the index 2705, is rendered by processing which obscures that virtual object. For example, the transparency of that virtual object may be increased or its brightness may be decreased. On the other hand, the virtual object 2707, which is located within the high-priority region 2702 and corresponds to the index 2704, is rendered by skipping the obscuring processing or by setting the degree of obscuring processing to be lower than the virtual object 2708.

This processing which changes the rendering method of a virtual object depending on the location of the virtual object in the display region is done under the assumption that the observer does not put his or her attention on a portion outside the display region. When the relative size of a virtual object to the display region is large, even when an index is located outside the display region, the virtual object is likely to be rendered at the center of the display region. Hence, application of the processing is adjusted in consideration of the size of the virtual object. That is, when the virtual object is rendered near the center of the display region, the obscuring processing is skipped, or it is applied even to an identical virtual object in steps toward the outer side.

Figure 28:
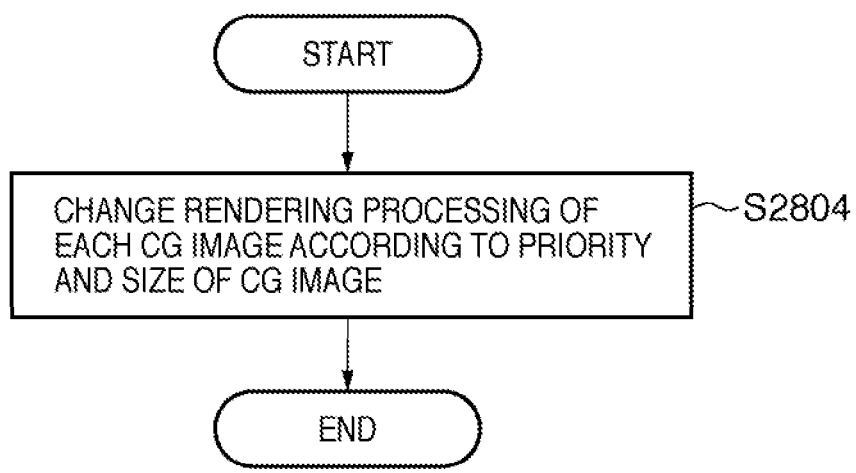
FIG. 28 is a flowchart showing virtual object rendering processing according to the fourth embodiment of the present invention.

FIG. 28 is a flowchart of virtual object rendering processing according to this embodiment. This embodiment will exemplify a case in which this virtual object rendering processing is executed in the first embodiment. Therefore, in this case, the processing according to the flowchart shown in FIG. 28 is executed in step S1005 above.

In step S2804, when corresponding virtual objects are laid out at the positions of respective indices, the priorities of the indices are referred to, and the virtual objects are rendered by a rendering method that obscures more the virtual objects to be laid out at the positions of the indices with lower priorities. That is, a virtual object image is generated in the same manner as in the first embodiment, except that the degree of distinction is controlled according to priorities at the time of rendering. Of course, as described above, when the size of a virtual object to be laid out at the position of an index with a low priority is large relative to the display region, the degree of distinction is not so decreased.

As described above, according to this embodiment, unnaturalness caused when a virtual object enters or leaves in or from the display region can be eliminated.

Note that in the first to fourth embodiments, the video see-through HMD has been described as the HMD. However, an optical see-through HMD may be used instead. In this case, since an image to be displayed is a virtual object image, the image composition unit may be omitted.

Fifth Embodiment

In the description of the first to third embodiments, all the units of the image processing apparatus shown in each of FIGS. 2, 12, and 20 are implemented by hardware components. However, the CG contents database 213 may be implemented by a memory, and other units may be implemented by software. In this case, a computer which includes a CPU for executing such software and that memory can be applied to the image processing apparatus.

Figure 3:
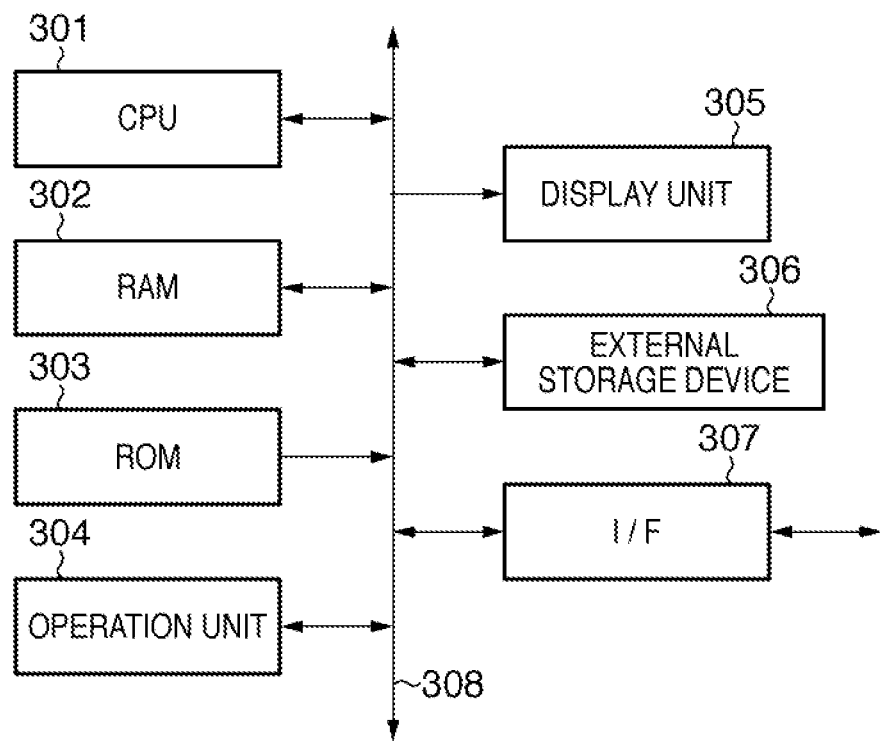
FIG. 3 is a block diagram showing an example of the hardware arrangement of a computer which is applicable to an image processing apparatus according to the first to third embodiments.

FIG. 3 is a block diagram showing an example of the hardware arrangement of a computer which is applicable to the image processing apparatus according to each of the first to third embodiments.

A CPU 301 controls the overall computer using computer programs and data stored in a RAM 302 and ROM 303, and executes the respective processes described above as those to be implemented by the image processing apparatus in each of the first to third embodiments.

The RAM 302 has an area for temporarily storing computer programs and data loaded from an external storage device 306 and various data received from the HMD via an I/F (interface) 307. Furthermore, the RAM 302 has a work area used when the CPU 301 executes various kinds of processing. That is, the RAM 302 can provide various areas as needed.

The ROM 303 stores setting data, a boot program, and the like of this computer.

An operation unit 304 includes a keyboard and mouse. When the operator of this computer operates the operation unit 304, he or she can input various instructions to the CPU 301.

A display unit 305 includes a CRT or liquid crystal panel, and can display the processing results of the CPU 301 by means of images and characters.

The external storage device 306 is a large-capacity information storage device represented by a hard disk drive. The external storage device 306 saves an OS (operating system), and computer programs and data that make the CPU 301 execute the respective processes described as those to be implemented by the image processing apparatus in each of the first to third embodiments. These computer programs include those for making the CPU 301 implement the functions of the respective units other than the CG contents database 213 in FIGS. 2, 12, and 20. In the external storage device 306, the CG contents database 213 is also registered. The computer programs and data saved in the external storage device 306 are loaded onto the RAM 302 as needed under the control of the CPU 301, and are to be processed by the CPU 301.

The I/F 307 connects this computer to the communication channel 203. This computer makes data communications with the HMD on the communication channel 203 via this I/F 307.

Reference numeral 308 denotes a bus which interconnects the aforementioned units.

Figure 4:
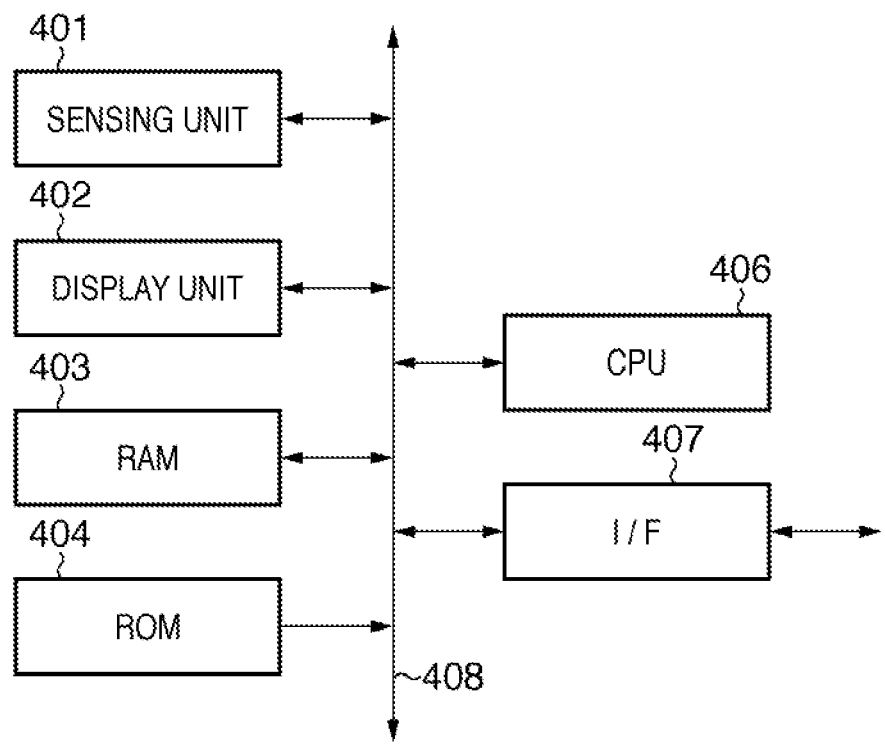
FIG. 4 is a block diagram showing an example of the hardware arrangement of an HMD which is applicable to that according to the first to third embodiments.

To the HMD described in each of the first to third embodiments, for example, an HMD with an example of the hardware arrangement shown in FIG. 4 is applicable. FIG. 4 is a block diagram showing an example of the hardware arrangement of an HMD which is applicable to that according to each of the first to third embodiments.

A sensing unit 401 corresponds to the sensing unit 204 (204R, 204L).

A display unit 402 corresponds to the display unit 216.

A RAM 403 has an area for temporarily storing data acquired from the image processing apparatus via an I/F 407, and also serves as the frame buffer 1210 and position and orientation information storage unit 2021. Furthermore, the RAM 403 also has a work area used when a CPU 406 executes various kinds of processing. That is, the RAM 403 can provide various areas as needed.

A ROM 404 stores setting data of the HMD, and computer programs for making the CPU 406 implement the functions of the respective units except for the sensing unit, display unit, frame buffer 1210, and position and orientation information storage unit 2021 in FIGS. 2, 12, and 20.

The CPU 406 controls the overall HMD using computer programs and data stored in the ROM 404 and RAM 403, and executes the respective processes described above as those to be implemented by the HMD in the first to third embodiments.

The I/F 407 connects the HMD to the communication channel 203, and the HMD makes data communications with the image processing apparatus on the communication channel 203 via this I/F 407.

Reference numeral 408 denotes a bus which interconnects the aforementioned units.

Note that the respective embodiments may be combined as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-264629 filed Oct. 10, 2008, which is hereby incorporated by reference herein in its entirety.

What is claimed is:

1. An image processing apparatus, comprising:
an acquisition unit configured to acquire an image of a physical space;
an extraction unit configured to extract feature amounts from a reduction image which is obtained by reducing a data amount of the acquired image;
a first generation unit configured to generate, based on the extracted feature amounts, a virtual object image of a virtual object so that at least a part of the virtual object is displayed within a display region of the acquired image; and
a second generation unit configured to generate, based on the generated virtual object image and the display region of the acquired image, a display image corresponding to the display region,
wherein the display region corresponds to a displayable range of a display unit on which the display image is to be displayed.

2. The apparatus according to claim 1, wherein the extraction unit is configured to extract the feature amounts from indices which are included in the reduction image and are arranged on the physical space.

3. The apparatus according to claim 1, wherein the extraction unit is configured to extract, as the feature amounts, natural features of the physical space which are included in the reduction image.

4. The apparatus according to claim 1, further comprising a clipping unit configured to clip, from the acquired image, a region corresponding to the display region,
wherein the second generation unit is configured to generate, by compositing the generated virtual object image and an image within the clipped region, the display image.

5. The apparatus according to claim 4, further comprising a specification unit configured to specify, based on a motion amounts within the acquired image, the display region,
wherein the clipping unit is configured to clip, from the acquired image, the region corresponding to the specified display region.

6. The apparatus according to claim 2, wherein the image of the physical space is an image captured by an image sensing unit.

7. The apparatus according to claim 6, further comprising:
a detection unit configured to detect the indices from the reduction image;
a setting unit configured to set a priority for at least one of the detected indices, and
a calculation unit configured to calculate, by preferentially using feature amounts extracted from indices with higher priorities, position and orientation information of the image sensing unit.

8. The apparatus according to claim 7, wherein the setting unit is configured to set a higher priority for an index closer to a central position of the reduction image.

9. The apparatus according to claim 7, wherein the setting unit is configured to set priorities of indices within the display region in the reduction image to be higher than priorities of indices outside the display region.

10. The apparatus according to claim 1, further comprising an output unit configured to output the generated display image to a head mounted display.

11. The apparatus according to claim 10, wherein the generated display image is enlarged via a display optical system of the head mounted display, and a user who wears the head mounted display on his/her head observes the enlarged display image.

12. An image processing apparatus, comprising:
a position and orientation image acquisition unit configured to acquire a position and orientation image which is captured by an image sensing unit;

an extraction unit configured to extract feature amounts from a reduction image which is obtained by reducing a data amount of the position and orientation image;

a background image acquisition unit configured to acquire a background image to be used as a background of a display image, wherein the background image is acquired by using a displayable range of a display unit on which the display image is to be displayed;

a virtual object generation unit configured to generate, based on feature amounts extracted from a region of the reduction image which does not overlap the background image, a virtual object image of a virtual object so that at least a part of the virtual object is composited with the background image; and a display image generation unit configured to generate the display image in which the generated virtual object image is composited with the acquired background image.

13. The apparatus according to claim 12, wherein the extraction unit is configured to extract the feature amounts from indices which are included in the reduction image and are arranged on a physical space.

14. The apparatus according to claim 12, wherein the extraction unit is configured to extract, as the feature amounts, natural features of a physical space which are included in the reduction image.

15. The apparatus according to claim 12, further comprising an output unit configured to output the generated display image to a head mounted display, wherein the generated display image is enlarged via a display optical system of the head mounted display, and a user who wears the head mounted display on his/her head observes the enlarged display image.

16. An image processing method, comprising:

acquiring an image of a physical space;

extracting feature amounts from a reduction image which is obtained by reducing a data amount of the acquired image;

generating, based on the extracted feature amounts, a virtual object image of a virtual object so that at least a part of the virtual object is displayed within a display region of the acquired image; and generating, based on the generated virtual object image and the display region of the acquired image, a display image corresponding to the display region, wherein the display region corresponds to a displayable range of a display unit on which the display image is to be displayed.

17. An image processing method, comprising:

acquiring a position and orientation image which is captured by an image sensing unit;

extracting feature amounts from a reduction image which is obtained by reducing a data amount of the position and orientation image;

acquiring a background image to be used as a background of a display image, wherein the background image is acquired by using a displayable range of a display unit on which the display image is to be displayed;

generating, based on feature amounts extracted from a region of the reduction image which does not overlap the background image, a virtual object image of a virtual object so that at least a part of the virtual object is composited with the background image; and generating the display image in which the generated virtual object image is composited with the acquired background image.

18. A non-transitory computer-readable medium storing a program for causing a computer to function as units comprising:

an acquisition unit configured to acquire an image of a physical space;

an extraction unit configured to extract feature amounts from a reduction image which is obtained by reducing a data amount of the acquired image;

a first generation unit configured to generate, based on the extracted feature amounts, a virtual object image of a virtual object so that at least a part of the virtual object is displayed within a display region of the acquired image; and a second generation unit configured to generate, based on the generated virtual object image and the display region of the acquired image, a display image corresponding to the display region, wherein the display region corresponds to a displayable range of a display unit on which the display image is to be displayed.

19. A non-transitory computer-readable medium storing a program for causing a computer to function as units comprising:

a position and orientation image acquisition unit configured to acquire a position and orientation image which is captured by an image sensing unit;

an extraction unit configured to extract feature amounts from a reduction image which is obtained by reducing a data amount of the position and orientation image;

a background image acquisition unit configured to acquire a background image to be used as a background of a display image, wherein the background image is acquired by using a displayable range of a display unit on which the display image is to be displayed;

a virtual object generation unit configured to generate, based on feature amounts extracted from a region of the reduction image which does not overlap the background image, a virtual object image of a virtual object so that at least a part of the virtual object is composited with the background image; and a display image generation unit configured to generate the display image in which the generated virtual object image is composited with the acquired background image.

* * * * *